United States Patent
Obermueller

(10) Patent No.: US 10,247,604 B2
(45) Date of Patent: Apr. 2, 2019

(54) SPECTROMETER, METHOD FOR MANUFACTURING A SPECTROMETER, AND METHOD FOR OPERATING A SPECTROMETER

(71) Applicant: Infineon Technologies AG, Neubiberg (DE)

(72) Inventor: Christian Obermueller, Brunnthal (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 655 days.

(21) Appl. No.: 14/527,796

(22) Filed: Oct. 30, 2014

(65) Prior Publication Data
US 2016/0123808 A1 May 5, 2016

(51) Int. Cl.
*G01J 3/02* (2006.01)
*G01J 3/45* (2006.01)
*G01J 3/26* (2006.01)
*G02B 26/00* (2006.01)
*G02B 13/00* (2006.01)

(52) U.S. Cl.
CPC .......... *G01J 3/0259* (2013.01); *G01J 3/0227* (2013.01); *G01J 3/26* (2013.01); *G01J 3/45* (2013.01); *G02B 26/001* (2013.01); *G02B 13/001* (2013.01)

(58) Field of Classification Search
CPC .......... G01J 3/45; G01J 3/0259; G01J 3/0291; G01J 3/26; G01J 3/02; G01J 3/10; G01J 3/2823
See application file for complete search history.

(56) References Cited

U.S. PATENT DOCUMENTS 3,635,562 A * 1/1972 Catherin .............. H04R 23/008
356/506
5,646,729 A 7/1997 Koskinen et al.
(Continued)

FOREIGN PATENT DOCUMENTS

CN 1442677 A 9/2003
CN 101320126 A 12/2008
(Continued)

OTHER PUBLICATIONS

"Experiment 4: The Fabry-Perot Interferometer" pp. 1-24, print-out of Dec. 5, 2014, see http://www.physics.iitm.ac.in/~ph5060/manuals/FabryPerot.pdf.

*Primary Examiner* — Mohamed K Amara
(74) *Attorney, Agent, or Firm* — Viering, Jentschura & Partner MBB

(57) ABSTRACT

In various embodiments a spectrometer is provided. The spectrometer may include a first mirror unit which is semi-transparent for electromagnetic radiation of at least one wavelength or wavelength range; and a second mirror unit having a first area and a second area facing the first mirror unit, wherein at least a part of the first area and the second area are spaced apart from the first mirror unit, wherein the first area is at least partially reflective for the electromagnetic radiation of at least one wavelength or wavelength range, wherein the second area includes at least a part of a photodetector, and wherein the photodetector is configured to detect the electromagnetic radiation of at least one wavelength or wavelength range.

26 Claims, 16 Drawing Sheets

(56) References Cited

U.S. PATENT DOCUMENTS

| | | | |
|---|---|---|---|
| 5,825,528 A | 10/1998 | Goossen | |
| 6,275,324 B1 * | 8/2001 | Sneh | G02B 26/001 359/223.1 |
| 6,341,039 B1 | 1/2002 | Flanders et al. | |
| 6,466,354 B1 * | 10/2002 | Gudeman | G01J 3/26 359/231 |
| 6,763,718 B1 * | 7/2004 | Waters | G01P 15/093 356/506 |
| 6,958,818 B1 | 10/2005 | Payne | |
| 2002/0126726 A1 * | 9/2002 | Flanders | G02B 5/1828 372/107 |
| 2005/0134962 A1 * | 6/2005 | Verghese | G01J 3/26 359/579 |
| 2008/0239494 A1 * | 10/2008 | Zander | G02B 26/001 359/578 |

FOREIGN PATENT DOCUMENTS

| | | |
|---|---|---|
| CN | 101532880 A | 9/2009 |
| DE | 102009021936 A1 | 11/2010 |
| JP | 200031510 A | 1/2000 |
| JP | 2011117884 A | 6/2011 |

\* cited by examiner

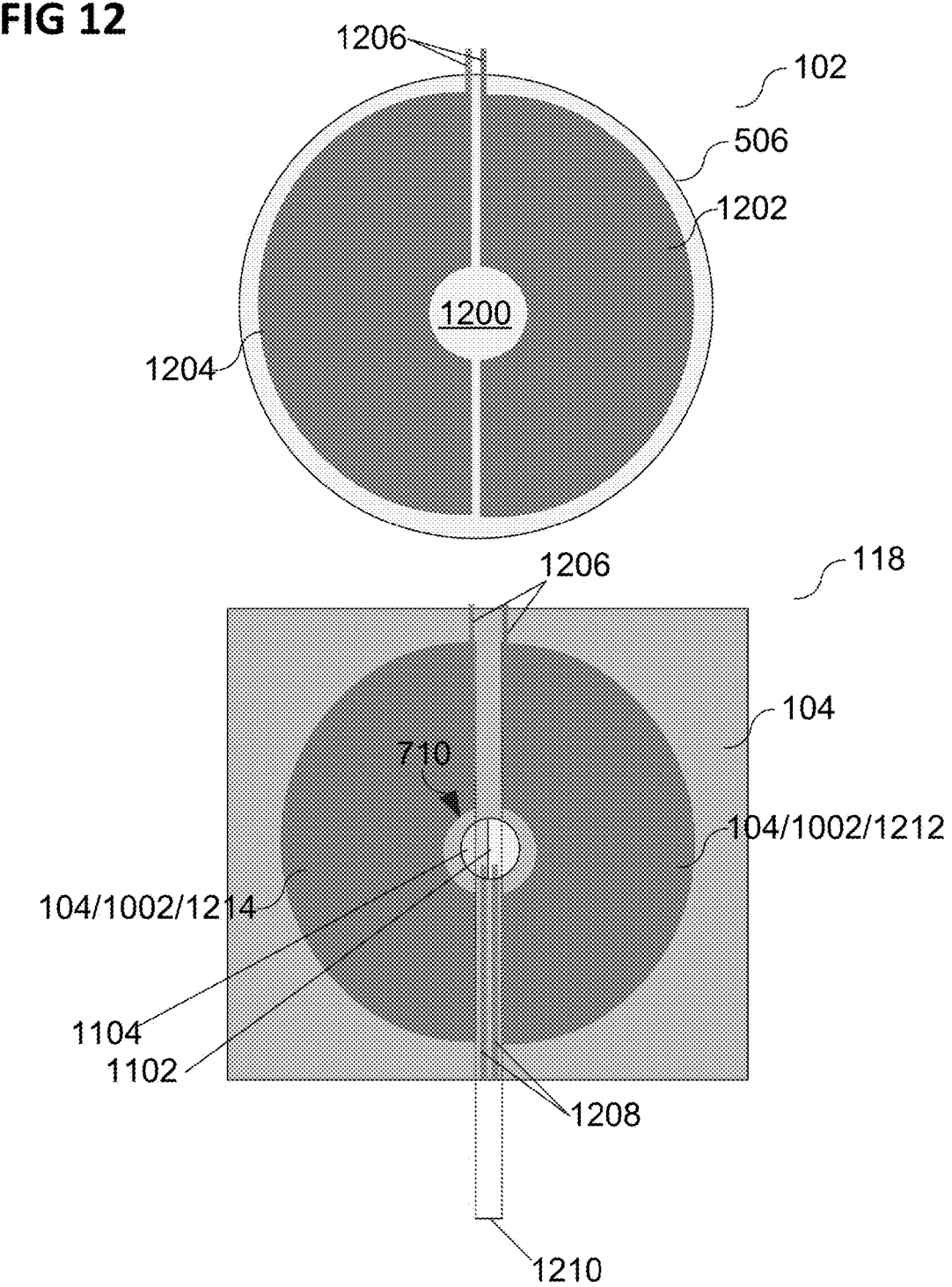

SPECTROMETER, METHOD FOR MANUFACTURING A SPECTROMETER, AND METHOD FOR OPERATING A SPECTROMETER

TECHNICAL FIELD

Various embodiments relate generally to a spectrometer, a method for manufacturing a spectrometer, and a method for operating a spectrometer.

BACKGROUND

Spectrometers having an interferometer for electromagnetic radiation may need a mirror system and a detector. Conventional interferometers may have a size of about a few cubic centimeters. Thus, such spectrometers may be too large to be used in size restricted applications, e.g. in smart phones or automotive applications.

SUMMARY

In various embodiments a spectrometer is provided. The spectrometer may include a first mirror unit which is semi-transparent for electromagnetic radiation of at least one wavelength or wavelength range; and a second mirror unit including a first area and a second area facing the first mirror unit, wherein at least a part of the first area and the second area are spaced apart from the first mirror unit, wherein the first area is at least partially reflective for the electromagnetic radiation of at least one wavelength or wavelength range, wherein the second area includes at least a part of a photodetector, and wherein the photodetector is configured to detect the electromagnetic radiation of at least one wavelength or wavelength range.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 12 shows a schematic drawing of electrodes used for distance determination and/or driving in a spectrometer according to various embodiments;

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

In various embodiments, a spectrometer may be provided that may be based on or may be similar to a Fabry-Pérot interferometer. The spectrometer according to various embodiments may have a reduced size compared to a conventional spectrometer, e.g. less than about one cubic centimeter. The spectrometer may be usable for the detection of an electromagnetic radiation in the visible and/or near infrared wavelength range. Further, the spectrometer according to various embodiments may be based on using highly integrated semiconductor manufacturing methods and hence may be manufactured in a cost-efficient manner. Further, the spectrometer according to various embodiments may be very robust regarding its optical and/or mechanical properties by means of a monolithic integration of first and second mirror units and first and second areas of the second mirror unit. Thus, the spectrometer may be used for applications, e.g. by integrating the spectrometer in a device, for which a conventional spectrometer may be technically and commercially unreasonable, e.g. in automotive applications or smart phones, e.g. in applications for health analysis, drug analysis, food analysis, gas analysis, color analysis, astronomy. The reduction in size and cost of the spectrometer may open this method for mass deployment. For example, such a micro spectrometer may be integrated in each handheld device or smart phone. Further, applications of the spectrometer may be created by the mobile phone app-writer community.

Figure 1A:
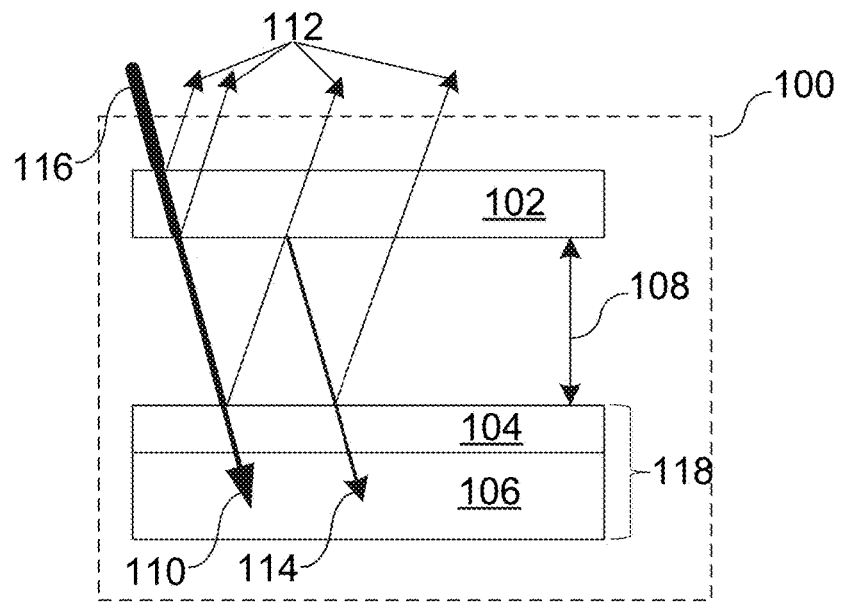
FIG. 1A and FIG. 1B illustrate elements of a spectrometer according to various embodiments.

FIG. 1A illustrates elements of a spectrometer 100 according to various embodiments. The spectrometer 100 may include a first mirror unit 102 and a second mirror unit 118. The second mirror unit 118 may include a first area 104 and a second area 106. The first mirror unit 102 may be spaced apart, e.g. by a distance 108, from the second mirror unit 118. The space between the first mirror unit 102 and the second mirror unit 118 with the distance 108 forms an interference gap for incident electromagnetic radiation 118 of at least one given wavelength or wavelength range transmitted by the first mirror unit 102.

An electromagnetic radiation 116 falls on the first mirror unit 102. The first mirror unit 102 may be semitransparent. That is, a part 112 of the incident electromagnetic radiation 116, e.g. of at least one wavelength 120 or wavelength range, may be reflected and another part 110, may be transmitted by the first mirror unit 102. The transmitted electromagnetic radiation 110 may be transmitted in the direction towards the second mirror unit 118 and falls on the first area 104 and second area 106 of the second mirror unit 118. The second mirror unit 118 may be arranged opposite to the first mirror unit 102 regarding the direction of the incident electromagnetic radiation 116. The second mirror unit 118 may be arranged to the first mirror unit 102 such that electromagnetic radiation from the first mirror unit 102 falls on the second mirror unit 118. In other words, the first mirror unit 102 may be arranged between the source of the incident electromagnetic radiation 116 and the second mirror unit 118 in the beam path of the incident electromagnetic radiation 116.

The first area 104 of the second mirror unit 118 may be at least partially reflective for the incident electromagnetic radiation of at least one wavelength 120 or wavelength range from the first mirror unit 102. Hence, incident electromagnetic radiation from the first mirror unit 102 may be reflected at least partially by the first area 104 of the second mirror unit 118 in the direction towards the first mirror unit 102. This electromagnetic radiation may be reflected again at least partially by the first mirror unit 102 in the direction towards the second mirror unit 118.

The spectrometer 100 may be formed such that electromagnetic radiation 110 from the spectrometer-external radiation source transmitted by the first mirror unit 102 may interfere with electromagnetic radiation 114 that may be reflected from the second mirror unit 118 in the direction towards the first mirror unit 102 and again reflected by the first mirror unit 102 in the direction towards the second mirror unit 118.

The second mirror unit 118 may include a photodetector wherein the second area 106 may include at least a part of the photodetector. The second area 106 may detect the electromagnetic radiation falling on the second mirror unit 118 from the first mirror unit 102. In other words, the photodetector may be configured to detect at least a part of the incident electromagnetic radiation 110, 114 of the at least one given wavelength or wavelength range.

Figure 1B:
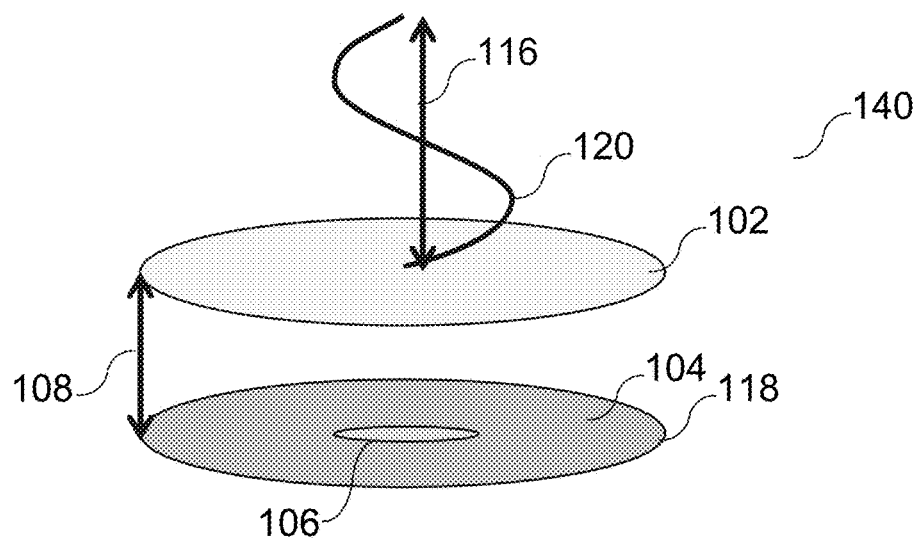

FIG. 1B illustrates a perspective view of elements of a spectrometer 140 according to various embodiments. The spectrometer 140 may be substantially similar to above described spectrometer 100. The perspective view shows a first mirror unit 102 and a second mirror unit 118. Further illustrated in FIG. 1B, in various embodiments, the second mirror unit 118 may be formed such that the first area 104 surrounds the second area 106. The first mirror unit 102 may be semitransparent for electromagnetic radiation 110 of at least one wavelength 120 or wavelength range.

As shown in FIG. 1A and FIG. 1B, in various aspects a spectrometer 100, 140 may be provided wherein the spectrometer 100, 140 may include a first mirror unit 102 and a second mirror unit 118. The first mirror unit 102 may be semitransparent for electromagnetic radiation of at least one wavelength 120 or wavelength range. The second mirror unit 118 may include a first area 104 and a second area 106 facing the first mirror unit 102. At least a part of the first area 104 and the second area 106 may be spaced apart (by about a distance 108) from the first mirror unit 102. The first area 104 may be at least partially reflective for the electromagnetic radiation of the at least one wavelength 120 or wavelength range. The second area 106 may include at least a part of a photodetector wherein the photodetector may be configured to detect the electromagnetic radiation of the at least one wavelength 120 or wavelength range. A photodetector integrated in a mirror unit of a spectrometer may allow to design spectrometers with a reduced thickness. Such spectrometers may be used for applications in which thin elements may be required, e.g. in mobile phones or automotive applications.

The first mirror unit 102 may be substantially aligned in parallel to the second mirror unit 118 to allow interference measurements with the photodetector in the second area 106. In other words, in various embodiments, the first mirror unit 102 may include a first surface and the second mirror unit 118 may include a second surface, the first surface and the second surface facing each other and being at least substantially parallel to each other. The second mirror unit 118 may be arranged opposite to the semitransparent first mirror unit 102 such that an optical cavity may be formed including the first mirror unit 102 and second mirror unit 118.

Figure 1C:
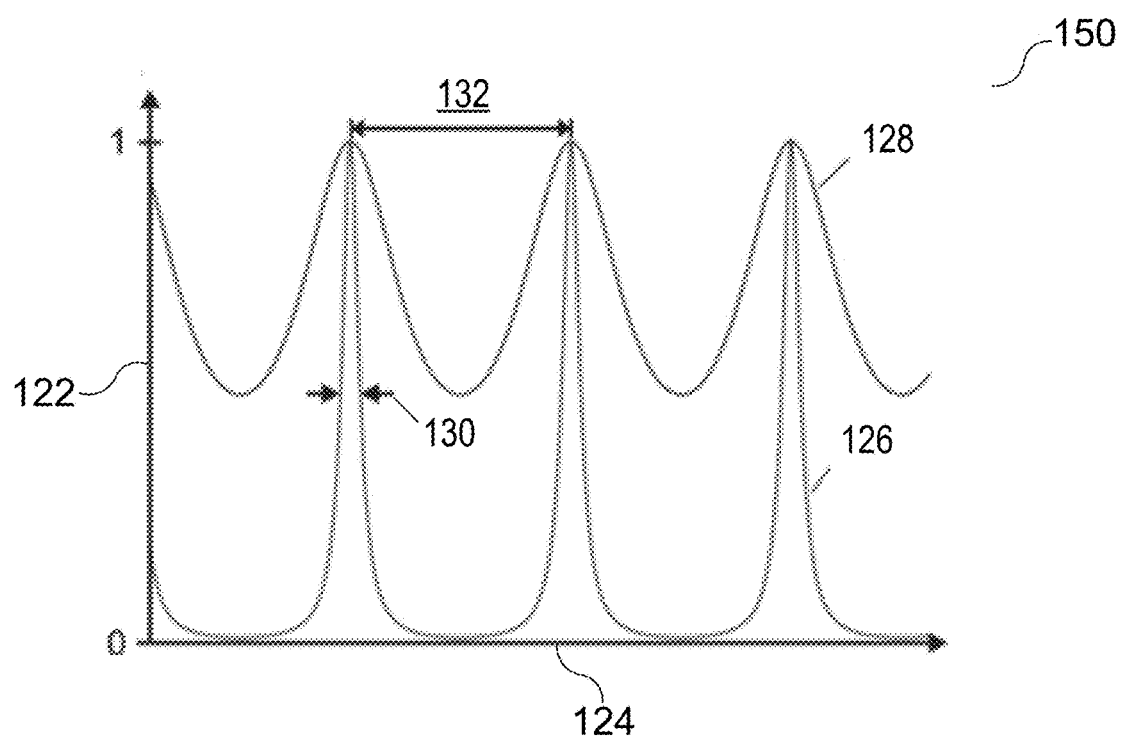
FIG. 1C illustrates a spectrum determined by a spectrometer according to various embodiments.

FIG. 1C illustrates a spectrum 150 determined by means of a spectrometer according to various embodiments, e.g. spectrometer 100 or 140. The spectrum may be detected by a photodetector of the spectrometer. The spectrum 150 illustrates an interference pattern having intensity maxima spaced apart at intervals 132, the intensity maxima having a certain width 130. In other words, a part of the incident electromagnetic radiation 116 of at least one wavelength 120 or wavelength range may be detected by the photodetector as a spectrum 150 having an intensity 122 as a function of wavelength 124 (also referred as signal of the photodetector). The intensity 122 as a function of wavelength 124 of the interference pattern depends on the distance 108 between the first mirror unit 102 and the second mirror unit 118, the reflectivity of the first mirror unit 102, the reflectivity of the first area 104 of the second mirror unit 118 and the wavelength 124 of the incident electromagnetic radiation 110, 114. The distance 132 between intensity maxima depends on the distance 108 between the first mirror unit 102 and the second mirror unit 118, the wavelength of the interfering electromagnetic radiation and the incident angle of the electromagnetic radiation on the first mirror unit.

Further, FIG. 1C illustrates the signal of the photodetector for a given distance 108 for a first finesse 126 and a second finesse 128. The finesse may be about the distance 132 between intensity maxima divided by the width 130 of the intensity maxima (full width half maximum—FWHM). The finesse of the spectrum with the second finesse 126 may be larger than the finesse of the spectrum with the first finesse 128.

In various embodiments, the spectrometer, e.g. spectrometer 100 or 140, may be formed as or may include a Fabry-Pérot spectrometer having a photodetector integrated in a mirror unit.

Figure 2A:
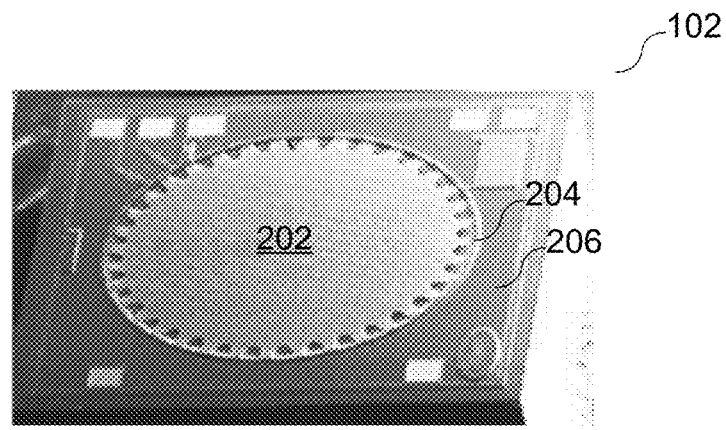
FIG. 2A and FIG. 2B illustrate elements of a spectrometer according to various embodiments.
Figure 2B:
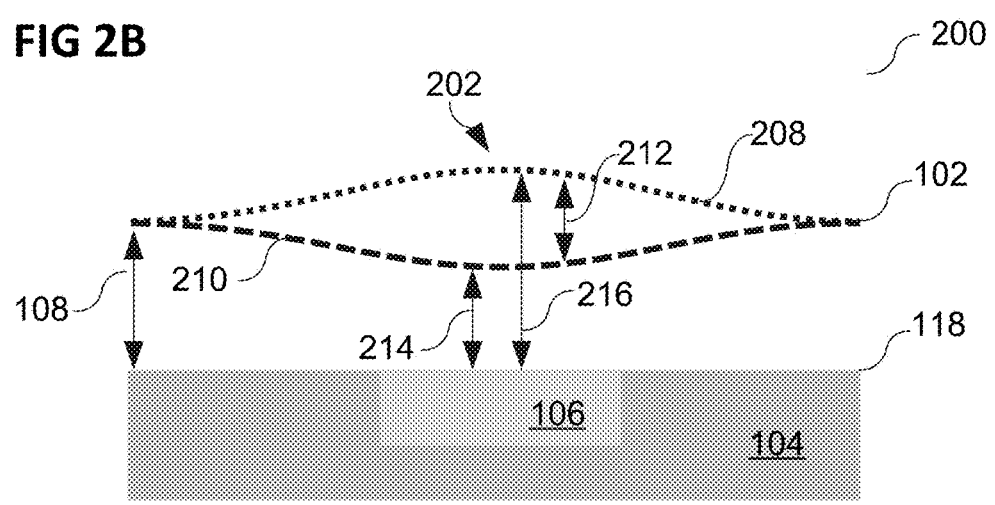
Figure 3A:
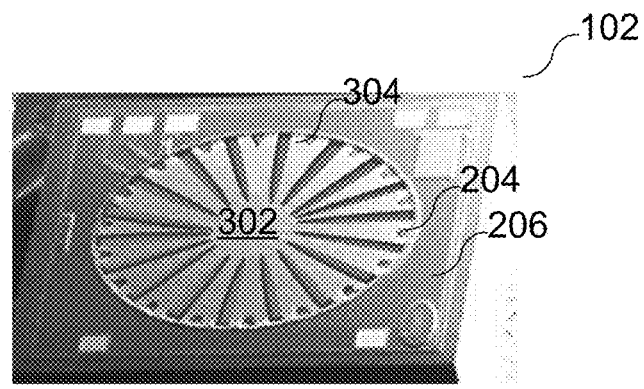
FIG. 3A to FIG. 3C illustrate elements of a spectrometer according to various embodiments.
Figure 3B:
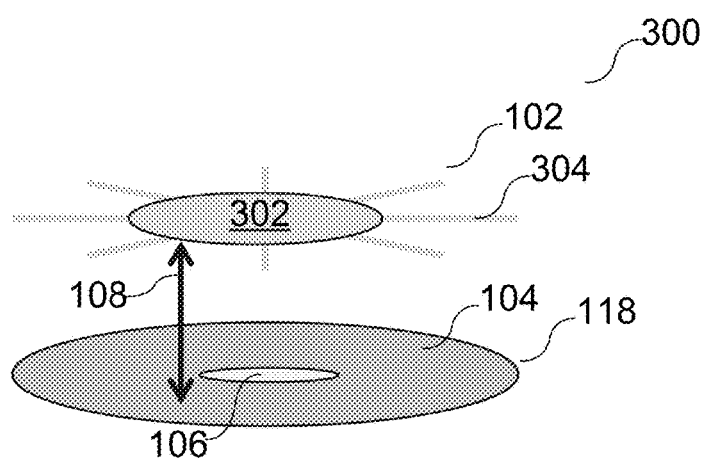
Figure 3C:
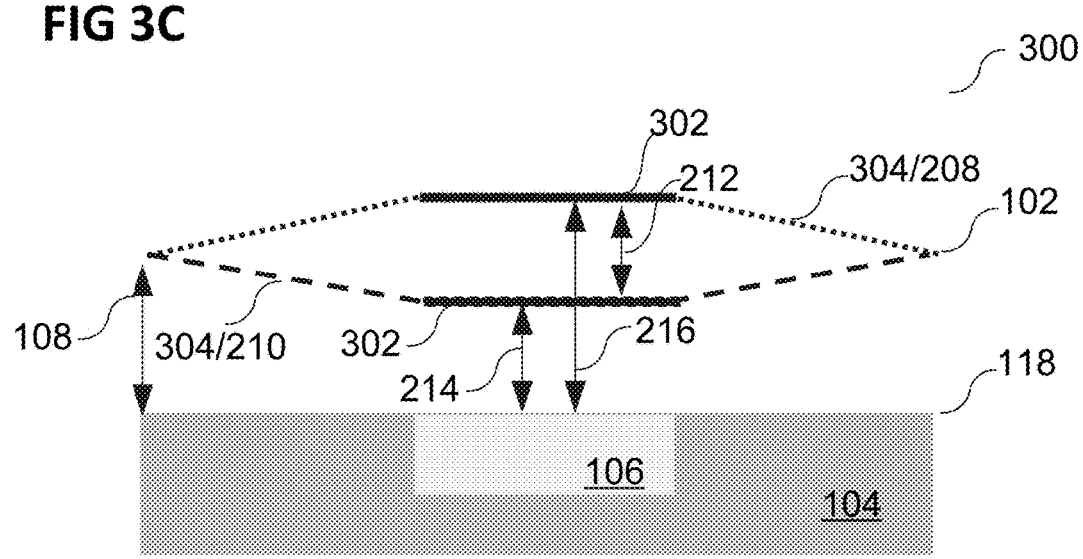
Figure 4A:
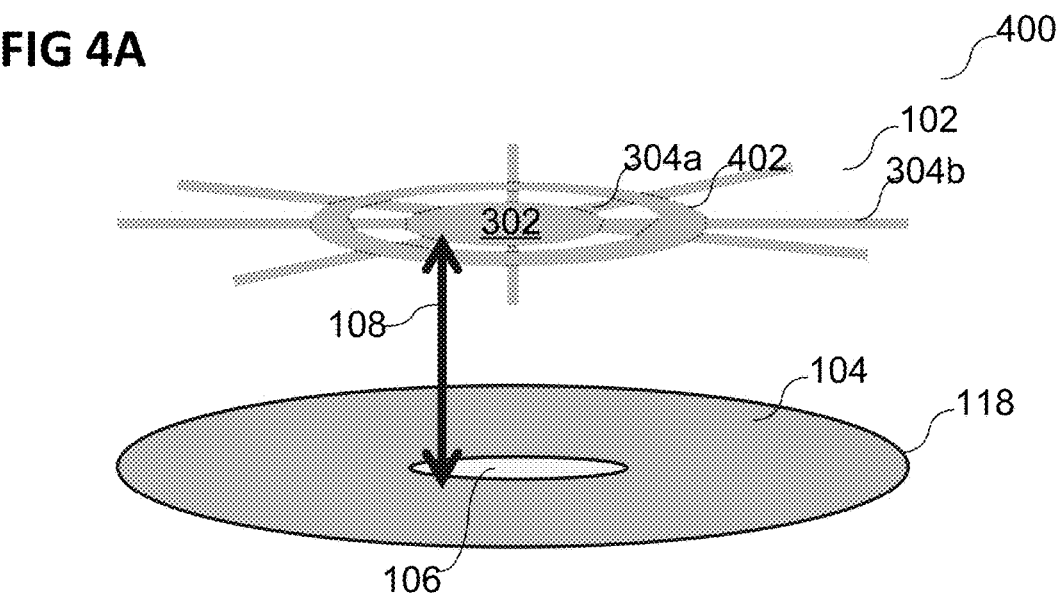
FIG. 4A and FIG. 4B illustrate elements of a spectrometer according to various embodiments.
Figure 4B:
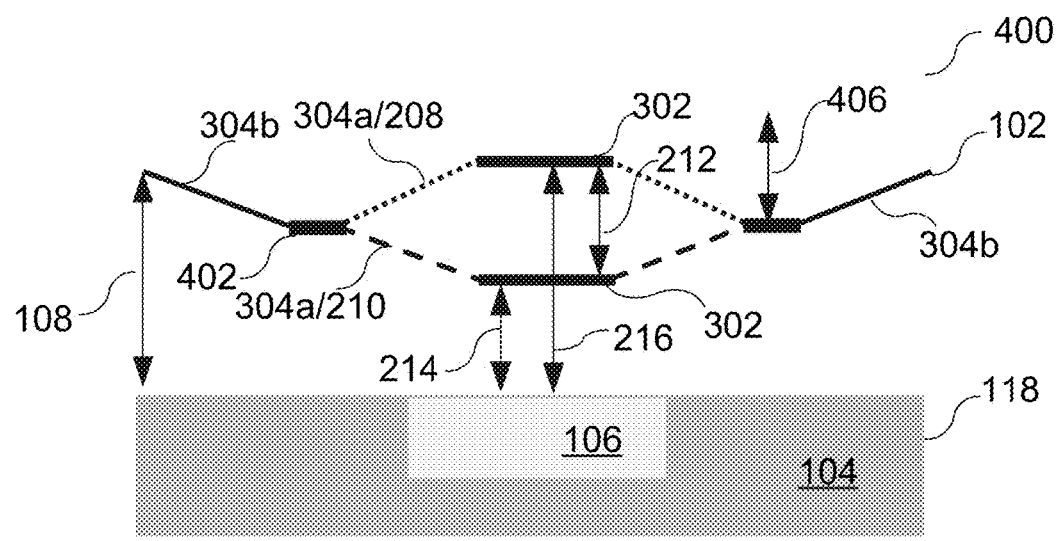

In various embodiments, the first mirror unit 102 may be formed such that the distance 108 between at least a part of the first mirror unit 102 (for example, a deflectable part, e.g. a planar area of a membrane) and the second mirror unit 118 may be adjustable (see e.g. FIG. 2B, FIG. 3C and FIG. 4B).

In various embodiments, the first mirror unit 102 may be formed as or may include a flexible mirror (see e.g. FIGS. 2A and 2B) regarding the electromagnetic radiation of the at least one given wavelength or wavelength range. Alternatively or in addition, the first mirror unit 102 may be formed as or may include a planar area as a mirror and at least one elastic element, e.g. as a mirror suspension beam, (see e.g. FIG. 3A to 3C and FIG. 4A to 4B).

Figure 8A:
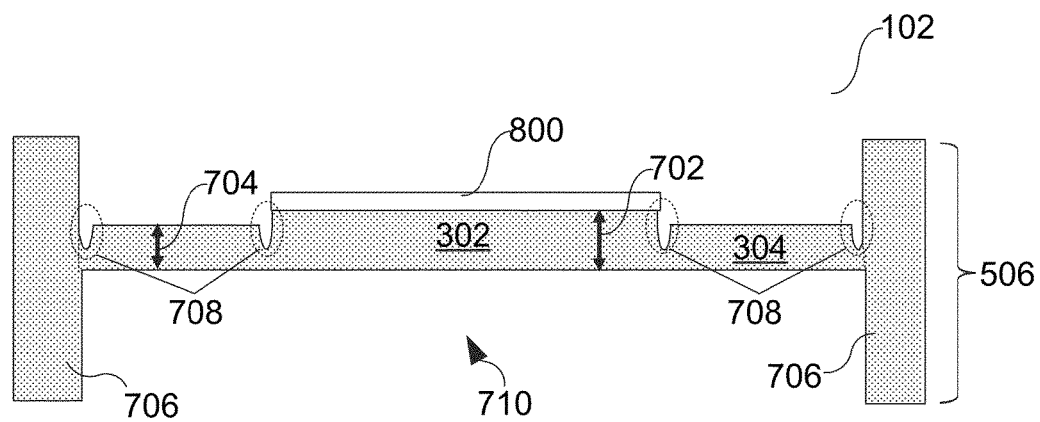
FIG. 8A and FIG. 8B illustrate two examples of a first mirror unit of a spectrometer according to various embodiments.
Figure 8B:
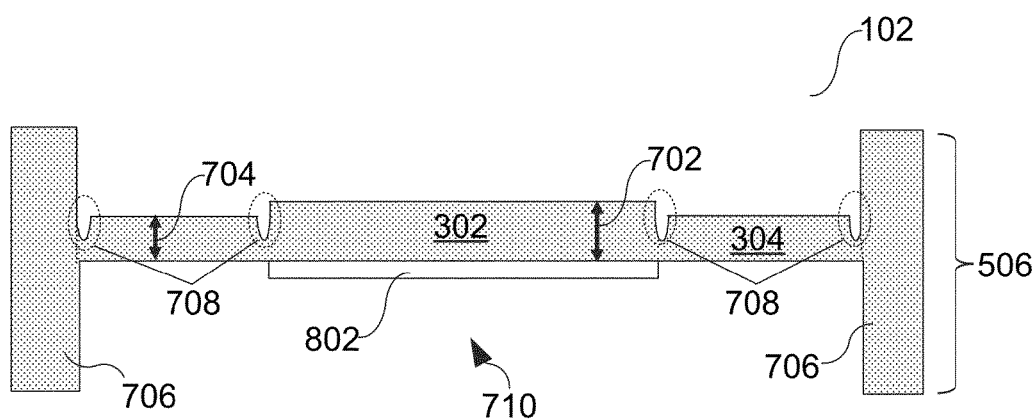

In various embodiments, the first mirror unit 102 may include a flexible mirror and a semitransparent mirror on top or on a bottom of the flexible mirror (see e.g. FIG. 8A and FIG. 8B).

Figure 10:
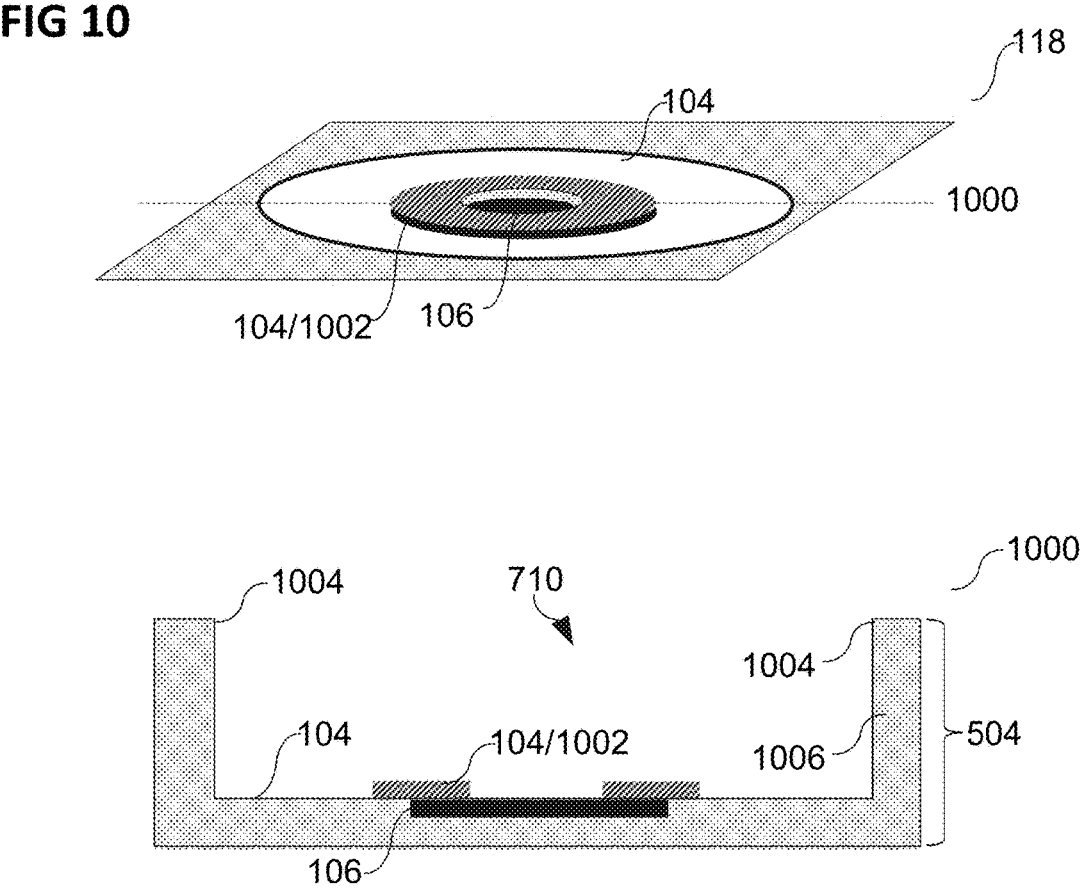
FIG. 10 illustrates a second mirror unit of a spectrometer according to various embodiments.

The second mirror unit 118 may be formed as or may include a static mirror regarding the electromagnetic radiation of at least one wavelength or wavelength range (see also FIG. 10).

In various embodiments, the spectrometer, e.g. spectrometer 100 or 140, further may include a source of an electromagnetic radiation (not illustrated). The radiation source may be arranged adjacent to at least one of the first mirror unit 102 or second mirror unit 118. The radiation source may be configured to emit at least a part of the electromagnetic radiation of at least one wavelength 120 or wavelength range. The intensity 122 of the signal of the photodetector may be amplified electronically and/or increased by means of the radiation source to increase the intensity of the incident electromagnetic radiation 110, 114 at the photodetector.

In various embodiments, the spectrometer, e.g. spectrometer 100 or 140, further may include an optical filter. The filter may be a polarization filter to polarize at least a part of the electromagnetic radiation of at least one wavelength 120 or wavelength range. Alternatively or in addition, the filter may be an absorption filter to absorb at least a part of the electromagnetic radiation of at least one wavelength 120 or wavelength range. The absorption filter may be formed as a band pass, short pass, long pass or notch filter. Alternatively or in addition, the absorption filter may be used as a pinhole, aperture or collimator, e.g. to avoid higher orders of interference signals at the photodetector. In various embodiments, the first mirror unit 102 may include the filter.

FIG. 2A shows a microscopic image of an embodiment of a first mirror unit 102 formed as a membrane 202 in a frame like structure 204 on or in a substrate or layer 206. The membrane 202 may be attached to the frame like structure 204 on or in the substrate or layer 206.

The first mirror unit 102 including the membrane 202 may be formed using a common process to form membranes, e.g. a process used to form an inorganic membrane, e.g. a silicon microphone membrane.

In various embodiments, the membrane 202 may be formed as a commercially available silicon microphone membrane. The membrane 202 may be formed with a diameter in a range of about 0.5 mm to about 5 mm, e.g. in a range of about 0.75 mm to about 3 mm, e.g. in a range of about 1 mm to about 2 mm, e.g. with a diameter of about 1.1 mm.

In various embodiments, the membrane 202 may include a planar area, e.g. in the center of the membrane 202. The planar area of the membrane 202 may be about planar regarding a bow or warp of the deflected membrane 202 within a deflection range.

FIG. 2B illustrates elements of a spectrometer 200 according to various embodiments. The spectrometer 200 may be substantially similar to above described spectrometer 100 or 140. FIG. 2B shows a schematic cross section of the spectrometer 200 having a first mirror unit 102 including a membrane 202 and a second mirror unit 118 having a first area 104 and a second area 106. The first mirror unit 102 may be spaced apart from the second mirror unit 118, e.g. by a distance 108.

Further illustrated in FIG. 2B, in various embodiments, the membrane 202 may be formed such that at least a part of the membrane 202 may be deflectable in a deflection range 212. In other words, in various embodiments, the first mirror unit 102 may be formed such that at least a part of the first mirror unit 102 may be deflectable in the direction towards the second mirror unit 118 and/or away from the second mirror unit 118. A part of the membrane 202 may be substantially planar, e.g. in the center of the membrane for small deflections. The deflection may allow adjusting of at least a part of the distance 108 between the first mirror unit 102 and the second mirror unit 118 in a deflection range 212 between a minimal distance 214 (additionally illustrated as membrane 210 in FIG. 2B) and a maximal distance 216 (additionally illustrated as membrane 208 in FIG. 2B).

In various embodiments, the deflectable part of the first mirror unit 102 may be formed such that the distance 108 between the deflectable part of the first mirror unit 102 and the second mirror unit 118 may be adjustable. In other words, the deflection may be adjustable, e.g. using electric attraction or repulsion. The adjustment of the deflection may be a step-like or discrete adjustment or in form of mechanic oscillations of the deflectable part of the first mirror unit 102.

The deflection range 212 may be adjustable in a range of a few nm, e.g. about 1 nm, to about a few hundred μm, e.g. about 750 μm; e.g. in a range of about 1 nm to about 750 μm, e.g. in a range of about 2 nm to about 650 μm, e.g. in a range of about 5 nm to about 500 nm.

Figure 2C:
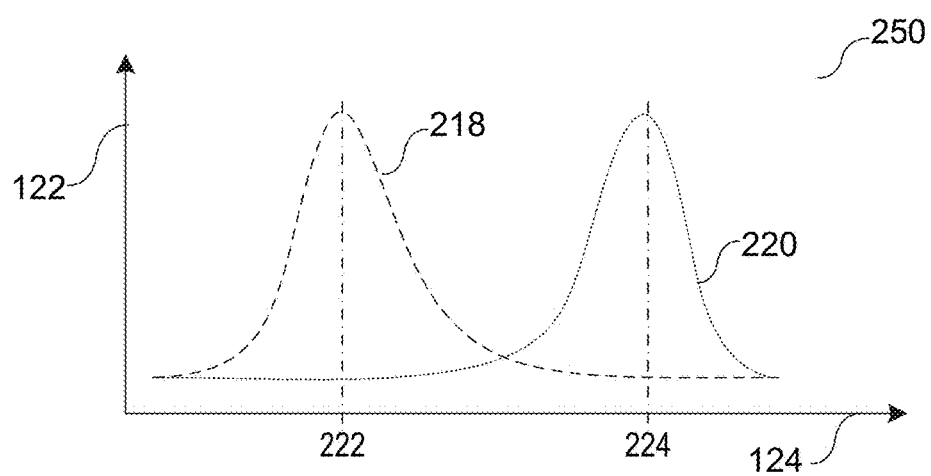
FIG. 2C illustrates a spectrum determined by a spectrometer according to various embodiments.

FIG. 2C illustrates a spectrum 250 determined by a spectrometer according to various embodiments, for example spectrometer 100 or 140, for two different deflections of the deflectable part of the first mirror unit 102, namely a first deflection (curve 218) corresponding to a minimal distance, e.g. distance 214 in FIG. 2B, and a second deflection (curve 220) corresponding to a maximal distance, e.g. distance 216 in FIG. 2B, of the deflectable part. FIG. 2C shows that, an intensity peak in the spectrum 250 determined by the photodetector is at a first wavelength 222 for the first deflection (218) and is at a second wavelength 224 for the second deflection (220), wherein the second wavelength is greater than the first wavelength.

In general, the wavelength 124 of the intensity peak in the spectrum 250 may be dependent on the wavelength of the interfering electromagnetic radiation, the distance 108 and the order N of the interference. The minimal distance, e.g. 214 in FIG. 2B, corresponding to curve 218 may be calculated by:

$L_{min} = \lambda_{min}/N$, wherein $L_{min}$ is the minimal distance and $\lambda_{min}$ is the wavelength 222 of the intensity peak in curve 218, and the maximal distance, e.g. 216 in FIG. 2B, corresponding to curve 220 may be calculated by:

Lmax=λmax/N, wherein Lmax is the maximal distance and λmax is the wavelength 224 of the intensity peak in curve 220.

The deflection range 212 between Lmax and Lmin may correspond to at least one order of interference of the electromagnetic radiation detectable between the first mirror unit 102 and the second mirror unit 118.

FIG. 3A illustrates elements of a spectrometer according to various embodiments. The spectrometer may be substantially similar to an embodiment of the above described spectrometer 100. FIG. 3A shows a microscopic image of an embodiment of a first mirror unit 102. The first mirror unit 102 may include at least one elastic element 304 and a planar area 302. In other words, in various embodiments, the first mirror unit 102 may include a substantially planar area 302 and at least one elastic element 304 wherein the planar area 302 may be mounted by the at least one elastic element 304, e.g. illustrated in FIG. 3A. The planar area 302 may be reflective regarding the electromagnetic radiation reflected from the second mirror unit 118 towards the first mirror unit 102.

The planar area 302 may be mounted deflectable by means of the at least one elastic element 304. In various embodiments, the planar area 302 of the first mirror unit 102 may be substantially plane parallel to the second mirror unit 118. The planar area 302 may be about plane parallel to at least one of the first area 104 or second area 106 of the second mirror unit 118. In various embodiments, the planar area 302 and the at least one elastic element 304 may be part of a membrane, e.g. a silicon microphone membrane resiliently mounted by narrow support beams, e.g. illustrated in FIG. 3A.

In various embodiments of the first mirror unit 102, the at least one elastic element 304 may be formed by forming areas of different material or different thickness than in the planar area 302. Alternatively or in addition, the at least one elastic element may be formed by open holes in a substantially planar layer or coating. Alternatively or in addition, the at least one elastic element 304 may be formed as or may include a bearing or a hinge. The at least one elastic element 304 may include a structure with a shape similar to at least one of a leaf spring, a cantilever spring, a torsion spring, e.g. a coil spring, a balance spring; a coned-disc spring (sometimes also referred to as Belleville washer, conical spring washer, disc spring or cupped spring washer), or a mainspring, (see also FIG. 9A to FIG. 9E). The at least one elastic element 304 may be formed from the same material as the planar area 302 with a different thickness; or from a different material. In other words, the at least one elastic element 304 may be formed of or include an elastic material, e.g. similar to a cantilever or leaf spring. Alternatively or in addition, an elastic element such as elastic element 304 may include a hinge or a bearing, (see also FIG. 7).

FIG. 3B illustrates elements of a spectrometer 300 according to various embodiments. The spectrometer 300 may be substantially similar to an embodiment of the above described spectrometer 100. FIG. 3B shows a schematic perspective view of the spectrometer 300 having a first mirror unit 102 that may be substantially similar to the first mirror unit 102 illustrated in FIG. 3A. In other words, in various embodiments, the first mirror unit 102 may be formed such that at least a part of the first mirror unit 102, e.g. the planar area 302, may be deflectable in at least one of a direction towards the second mirror unit 118 or away from the second mirror unit 118, e.g. illustrated in FIG. 3B.

FIG. 3C illustrates a schematic cross section of the spectrometer 300. As illustrated in FIG. 3C, the planar area 302 may be deflectable in a deflection range 212 between a minimal distance 214 and a maximal distance 216 substantially similar as shown in FIG. 2B.

FIG. 4A illustrates elements of a spectrometer 400 according to various embodiments. The spectrometer 400 may be substantially similar to an embodiment of the above described spectrometer 100. Further illustrated in FIG. 4A, the spectrometer 400 may include at least two elastic elements 304a, 304b, e.g. at least one first elastic element 304a and at least one second elastic element 304b. The first elastic element 304a may be coupled with the second elastic element 304b by a connecting structure 402. In other words, the at least one first elastic element 304a may be connected via a connecting structure 402 or a driving circuit with the at least one second elastic element 304b.

The connecting structure 402 may be formed e.g. as a hinge, bearing or joint. In various embodiments, the second elastic element 304b may be formed substantially similar to the first elastic element 304a. In various embodiments, the spectrometer 400 may include at least two different elastic elements. In one embodiment, the spectrometer may include the at least one first elastic element 304a and the at least one second elastic element 304b, e.g. illustrated in FIG. 4A, 4B. The at least one first elastic element 304a may be used to adjust a first deflection, e.g. in a deflection range 212 of about 1 nm to about 100 nm. The at least one second elastic element 304b may be used to adjust a second deflection, e.g. in a deflection range 406 of about 100 nm to about a few micrometers or centimeters. In other words, the at least one first elastic element 304a may be used for a fine adjustment and the at least one second elastic element 304b may be used for a coarse adjustment of the distance 108 between the first mirror unit 102 and the second mirror unit 118.

The at least two elastic elements 304a, 304b may be used to adjust different deflections and/or tilts. Thus, the alignment and the number of orders detected by the photodetector may be adjustable.

The elastic elements 304a, 304b may be used for static deflections or deflections including mechanic oscillations, e.g. the first elastic element for the fine adjustment may be used for deflections having mechanic oscillations and the second elastic element for the coarse adjustment may be used for static or step-like deflections, e.g. a static offset.

FIG. 4B illustrates a schematic cross section of the spectrometer 400. As illustrated in FIG. 4B, the planar area 302 may be deflectable by means of the first elastic element 304a in a first deflection range 212, e.g. between a minimal distance 214 and a maximal distance 216 for a given deflection of the second elastic element 304b substantially similar as shown in FIG. 2B or FIG. 3C. Further, illustrated in FIG. 4B, the planar area 302 may be deflectable by means of the second elastic element 304b in a second deflection range 406.

In various embodiments, the at least one first elastic element 304a and the at least one second elastic element 304b may be deflected periodically or aperiodically. In various embodiments, the second elastic element 304b may be deflected aperiodically or with lower frequency than the first elastic element 304a.

A spectrometer in accordance with various embodiments, e.g. spectrometer 100, may include at least one driving circuit configured to deflect at least a part of the first mirror unit 102 relative to the first area 104 and second area 106 of the second mirror unit 118. The driving circuit may be configured to adjust the distance 108 between the first mirror unit 102 and the second mirror unit 118, e.g. by means of electric attraction or repulsion.

Figure 13:
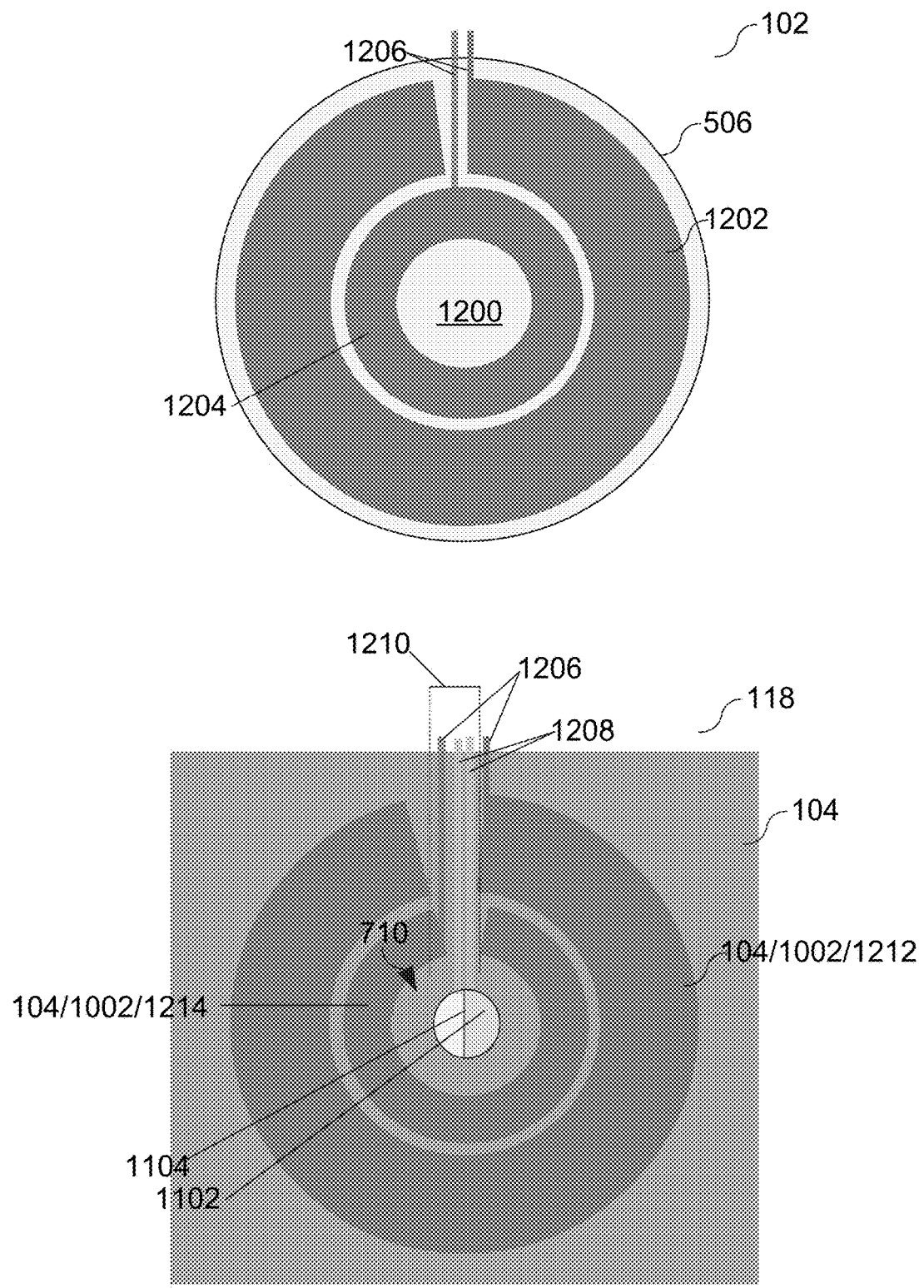
FIG. 13 shows a schematic drawing of electrodes used for distance determination and/or driving in a spectrometer according to various embodiments.

The driving circuit may be electrically coupled to at least one electrode of the first and second mirror units, as described in more detail in FIG. 12 and FIG. 13.

In various embodiments, the at least one driving circuit may be configured to deflect a part of the first mirror unit 102 in a range of about the wavelength or wavelength range of the electromagnetic radiation detectable by the photodetector or less.

Alternatively or in addition, the driving circuit may be configured to displace or deflect a part of the first mirror unit 102 relative to the second mirror unit 118 with a displacement in a range of about a few hundreds of nanometers or micrometers to about a few centimeters.

In various embodiments, the spectrometer, e.g. spectrometer 400, may include at least a first driving circuit and a second driving circuit wherein the first driving circuit may be configured to coarsely adjust the distance 108 between the planar area 302 of the first mirror unit 102 and the second mirror unit 118, and the second driving circuit may be configured to finely adjust the distance 108 between the planar area 302 of the first mirror unit 102 and the second mirror unit 118. For example, the first driving circuit may be configured to adjust a distance between the connecting structure 402 and the second mirror unit 118 (for example, within the deflection range 406 shown in FIG. 4B), and the second driving circuit may be configured to adjust a deflection of the planar area 302 of the first mirror unit 102 relative to the connecting structure 402 (for example, within the deflection range 212 shown in FIG. 4B). In various embodiments, the coarse adjustment achieved by the first driving circuit and the fine adjustment achieved by the second driving circuit may be configured such that a distance between the planar area 302 and the second mirror unit 118 may be varied continuously from a minimal distance (e.g. distance 214 shown in FIG. 4B) up to a maximal distance (not shown in FIG. 4B), or the coarse adjustment and fine adjustment may be configured such that the distance between the planar area 302 and the second mirror unit 118 may be varied in discrete steps from the minimal distance (e.g. distance 214) up to the maximal distance.

In various embodiments, the at least one driving circuit may be configured to adjust a tilt between the first mirror unit 102 and the second mirror unit 118.

Figure 5:
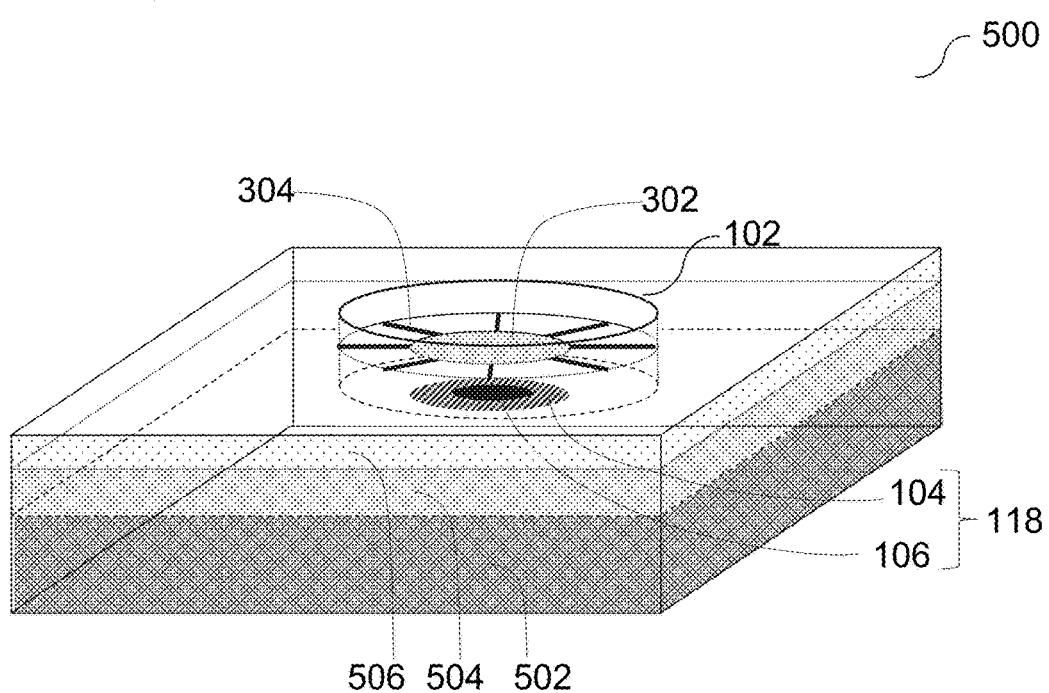
FIG. 5 illustrates a spectrometer according to various embodiments.

FIG. 5 illustrates a spectrometer 500 according to various embodiments. The spectrometer may be substantially similar to an embodiment of the above described spectrometer 300. For example, a first mirror unit 102 of the spectrometer 500 may be substantially similar to the first mirror unit illustrated in FIG. 3B or FIG. 3C. The spectrometer 500 may include a substrate 502, a first layer 504 disposed over the substrate 502, and a second layer 506 disposed over the first layer 504. The second layer 506 may include an upper bulk material, the first layer 504 a spacer bulk material and the substrate 502 a lower bulk material. The second layer 506 may include the first mirror unit 102 and the first layer 504 may include the second mirror unit 118. At least one of the bulk materials may include silicon or another common semiconductor material or metal. The spectrometer 500 may be formed monolithically. In other words, the first mirror unit 102 and the second mirror unit 118 may be formed monolithically integrated.

In various embodiments, the second layer 506 may include or may be formed from a dielectric material. The deflectable part of the first mirror unit 102 may be formed by reducing the thickness of a bulk material, e.g. by use of an etching process or a back grinding process. In various embodiments, the bulk material of the first mirror unit 102 may include or may be formed from an oxide, a nitride or an oxynitride, e.g. a silicon oxide or a silicon nitride.

In various embodiments, the spectrometer 500 further may include a mirror spacer (not shown) in the space between the first mirror unit 102 and the second mirror unit 118. The mirror spacer may be formed as a fixed or static mount or spacer.

Figure 6:
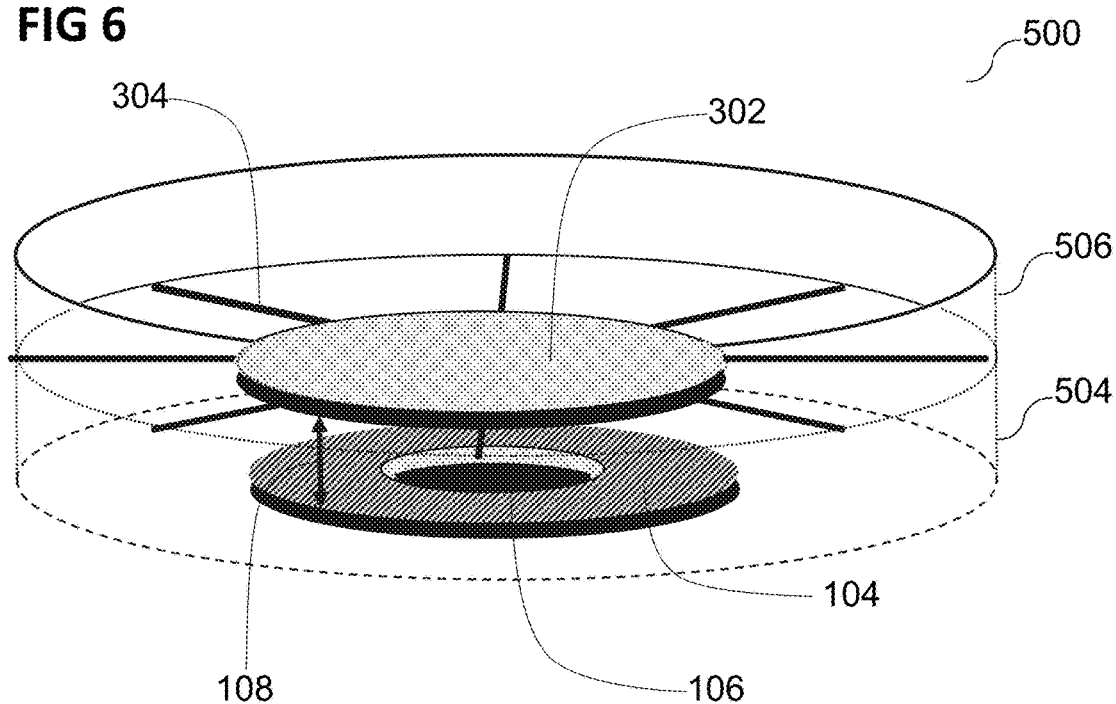
FIG. 6 illustrates elements of the spectrometer of FIG. 5 according to various embodiments.

FIG. 6 illustrates elements of the spectrometer 500 in an enlarged view.

Figure 7:
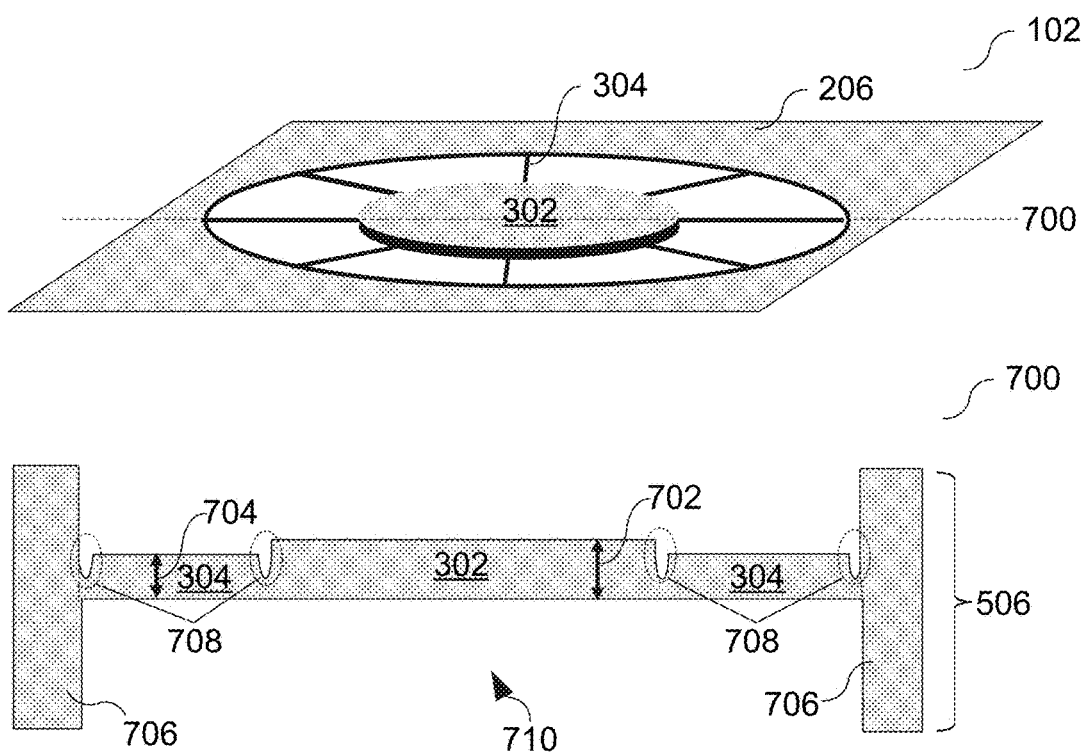
FIG. 7 illustrates a first mirror unit of a spectrometer according to various embodiments.

FIG. 7 illustrates a first mirror unit 102 of a spectrometer, e.g. spectrometer 500, according to various embodiments. The spectrometer may be substantially similar to an embodiment of an above described spectrometer. FIG. 7 shows a perspective view of the first mirror unit 102 and a schematic cross section 700 of the first mirror unit 102. In the cross section 700 are illustrated the planar area 302 having a first thickness 702 and elastic elements 304 having a second thickness 704.

The planar area 302 may be mounted by means of at least one elastic element 304 and/or a groove-like structure 708 in a frame-like structure 706. In other words, the at least one elastic element 304 may be connected via a groove-like structure 708 (beam hinge) with the planar area. In other words, the elastic element 304 may be connected with the planar area 302 by a groove structure 708, wherein the groove structure 708 may be used as a joint 708 between the elastic element 304 and the planar area 302. The groove structure 708 may reduce mechanical tensions and restoring forces in the material caused by a deflection of the deflectable part of the planar area.

Alternatively or in addition, the planar area 302 may have a first thickness 702 (mirror thickness) and the at least one elastic element 304 may have a second thickness 704 (beam thickness) wherein the elasticity of the elastic element 304 may be formed by the second thickness 704 being lower than the first thickness 702. Hence, the second thickness of the elastic element 304 may provide the elasticity for mounting the planar area 302 deflectable.

The frame-like structure 706 may be substantially similar to the frame like structure 206 illustrated in FIG. 2A or FIG. 3A. The second layer 506 may include the frame-like structure 706. Further illustrated in FIG. 7, the first mirror unit 102 may include an aperture 710. The second layer 506 may include at least a part of the aperture 710. In various embodiments, the aperture 710 may be formed by at least a part of the frame-like structure 706. In other words, in various embodiments, the spectrometer, e.g. spectrometer 500, may include an aperture 710 between the first mirror unit 102 and the second mirror unit 118. The aperture 710 may be formed above the second area 106 or above the photodetector. The aperture 710 may be formed as or may include an open hole, a pin hole (not shown), a lense (not shown) or a grid (not shown).

In various embodiments, the aperture 710 may be used to reduce the size of the photosensitive area of the photodetector that may be exposed to the electromagnetic radiation 110, 114 with at least one wavelength 120 or wavelength range. Alternatively or in addition, the aperture 710 may be used to increase the signal-to-noise ratio of the intensity 122 of the photodetector in the spectrum 150 (see e.g. FIG. 1C). The aperture 710 may include or be formed from an electrically conductive material, e.g. in form of a metal layer, e.g. as a structured metal layer. In various embodiments the second layer 506 may include the aperture 710. In various embodiments, the second layer 506 may include the first mirror unit 102 and the frame-like structure 706 used as the aperture 710, a collimator or a mount.

In various embodiments, the first mirror unit 102 may be formed from one piece. The first mirror unit 102 may be formed from a bulk semitransparent material. The bulk semitransparent material may also be the second layer 506.

FIG. 8A illustrates an example of a first mirror unit 102 of a spectrometer according to various embodiments. The first mirror unit 102 illustrated in FIG. 8A may be substantially similar to the first mirror unit 102 illustrated in FIG. 7. Further illustrated in FIG. 8A, the first mirror unit 102 may include at least one semitransparent layer 800 on a side of the planar area 302 facing a spectrometer external radiation source (not shown). In other words, in various embodiments, the first mirror unit 102 may include an at least partially transparent material of the second layer 506 and at least one semitransparent layer 800 or coating. The first mirror unit 102 may be arranged relative to the second mirror unit 118 in a way that the bulk material of the first mirror unit 102 may be arranged between the at least one semitransparent layer 800 of the first mirror unit 102 and the second mirror unit 118. In other words, the at least one semitransparent layer 800 may be facing away from the second mirror unit 118 and may face the source of the electromagnetic radiation with at least one wavelength 120 or wavelength range.

In various embodiments, the semitransparent layer 800 of the first mirror unit 102 may include an optical filter for a part of the incident electromagnetic radiation 116 with the at least one given wavelength or wavelength range, e.g. a band pass, long pass, short pass or notch filter.

In various embodiments, the semitransparent layer 800 may be formed as an anti-reflection coating and/or as a reflection layer. The semitransparent layer 800 may be formed anti-reflective regarding the side facing the radiation source of the electromagnetic radiation with at least one wavelength 120 or wavelength range. Thus, the semitransparent layer 800 may increase the intensity of the transmitted electromagnetic radiation with at least one wavelength 120 or wavelength range transmitted by the first mirror unit 102. Alternatively or in addition, the semitransparent layer 800 may be formed reflective regarding the side facing the second mirror unit 118. Thus, the semitransparent layer 800 may increase the intensity of the incident electromagnetic radiation with at least one wavelength 120 or wavelength range falling on the second mirror unit 118.

In various embodiments, the at least one semitransparent layer 800 may include at least two semitransparent layers. The semitransparent layers may be formed side by side or may be stacked over each other, e.g. forming a photonic crystal.

In various embodiments, at least one of the second layer 506 and the at least one semitransparent layer 800 may be formed from or may include a ceramic layer. Alternatively or in addition, at least one of the second layer 506 and the at least one semitransparent layer 800 may include a transparent conductive oxide.

In various embodiments, the semitransparent layer 800 may be formed or may include a metal layer. The metal may be deposited as layer on at least the deflectable part of the first mirror unit 102. The semitransparent layer 800 of the first mirror unit 102 may have a thickness depending on the used material of less than 100 nm to be semitransparent, e.g. in a range of about 0.1 nm to about 100 nm, e.g. in a range of about 5 nm to about 75 nm, e.g. in a range of about 10 nm to about 60 nm, e.g. about 50 nm. The metal layer may be formed from or may include at least one of the elements Ag, Al, Au, Pt, Cu, Si or Pd; a steel.

FIG. 8B illustrates an example of a first mirror unit 102 of a spectrometer 500 according to various embodiments. The spectrometer may be substantially similar to an embodiment of an above described spectrometer, e.g. spectrometer 500. The first mirror unit 102 illustrated in FIG. 8B may be substantially similar to the first mirror unit 102 illustrated in FIG. 7. Further illustrated in FIG. 8B, the first mirror unit 102 may include at least one semitransparent layer 800 on a side of the planar area 302 facing the second mirror unit 118 (not shown). In other words, in various embodiments, the first mirror unit 102 may be arranged relative to the second mirror unit 118 such that the at least one semitransparent layer 800 of the first mirror unit 102 may be arranged between the bulk material of the first mirror unit 102 and the second mirror unit 118. In other words, the semitransparent layer 800 may be facing the second mirror unit 118 and may face away from the radiation source of the electromagnetic radiation with at least one wavelength 120 or wavelength. The semitransparent layer 800 illustrated in FIG. 8B may be formed in a substantially similar way as the semitransparent layer 800 of FIG. 8A.

Figure 9A:
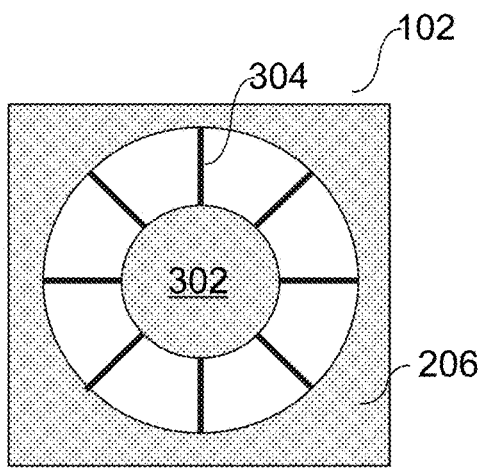
FIG. 9A to FIG. 9E illustrate various examples of a first mirror unit of a spectrometer according to various embodiments.

FIG. 9A illustrates an example of a first mirror unit 102, of a spectrometer 500 according to various embodiments. The first mirror unit 102 illustrated in FIG. 9A may be substantially similar to the first mirror unit illustrated in FIG. 7.

Figure 9B:
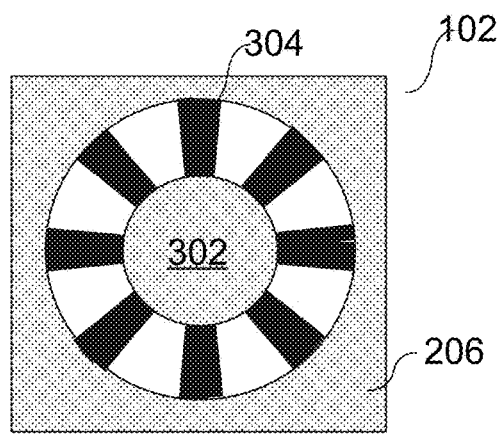

FIG. 9B illustrates an example of a first mirror unit 102, of a spectrometer according to various embodiments. The spectrometer may be substantially similar to an embodiment of an above described spectrometer. The first mirror unit 102 illustrated in FIG. 9B may be substantially similar to the first mirror unit illustrated in FIG. 9A. In various embodiments, the elastic element 304 may be varied regarding the wideness and shape of the elastic element (see FIG. 9A and FIG. 9B)

Figure 9C:
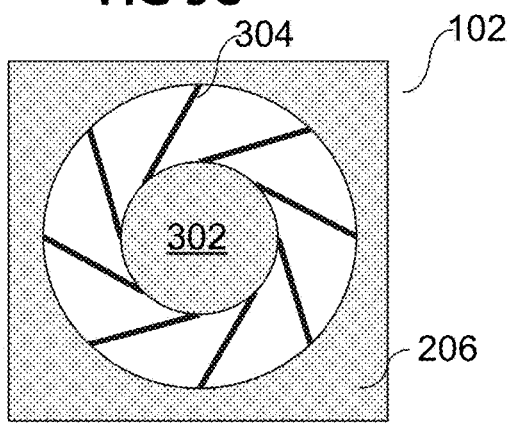

FIG. 9C illustrates an example of a first mirror unit 102, of a spectrometer according to various embodiments. The spectrometer may be substantially similar to an embodiment of an above described spectrometer. The first mirror unit 102 illustrated in FIG. 9C may be substantially similar to the first mirror unit illustrated in FIG. 9A. In various embodiments, the elastic element may be varied regarding an angle of the elastic element 304 relative to the planar area 302 and the bulk material of the layer 506 (see FIG. 9A and FIG. 9C).

Figure 9D:
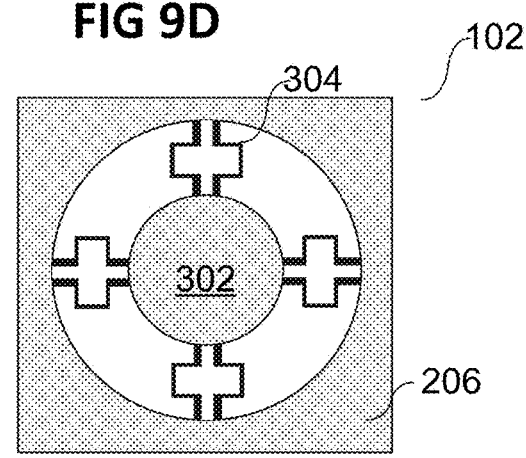

FIG. 9D illustrates an example of a first mirror unit of a spectrometer according to various embodiments. The spectrometer may be substantially similar to an embodiment of an above described spectrometer. The first mirror unit 102 illustrated in FIG. 9D may be substantially similar to the first mirror unit illustrated in FIG. 9A. In various embodiments, the elastic element 304 may be varied regarding the shape of the elastic element (see FIG. 9A and FIG. 9D). As shown in FIG. 9D, the elastic element 304 may have a meandering shape in an embodiment.

Figure 9E:
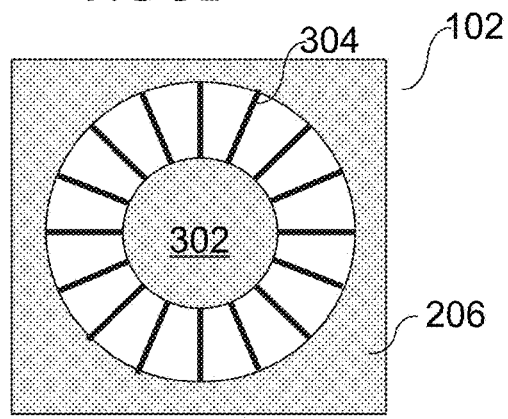

FIG. 9E illustrates an example of a first mirror unit 102, of a spectrometer according to various embodiments. The spectrometer may be substantially similar to an embodiment of an above described spectrometer. The first mirror unit 102 illustrated in FIG. 9E may be substantially similar to the first mirror unit illustrated in FIG. 9A. In various embodiments, the elastic element 304 may be varied regarding the number of elastic elements (see FIG. 9A and FIG. 9E).

FIG. 10 illustrates a second mirror unit 118, of a spectrometer according to various embodiments. The spectrometer may be substantially similar to an embodiment of an above described spectrometer. FIG. 10 shows a perspective view of the second mirror unit 118 and a schematic cross section 1000 of the second mirror unit 118. In the cross section 1000 of the second mirror unit 118 illustrated may be a first layer 504, wherein the first layer 504 may include the first area 104 and the second area 106. The second area 106 may include a part of a photodetector. The second mirror unit 118 may further include at least a part of an aperture 710. The aperture 710 may include a ring-like structure 1002 on or above the second area 106. Alternatively or in addition, the second mirror unit 118 may be formed such that it may include a cavity wherein the aperture 710 may be formed by means of the "side walls 1006" that may form the cavity. The first area 104 may include the side walls 1006 and/or the ring-like structure 1002.

Further illustrated in FIG. 10, the second mirror unit 118 may include a mounting structure 1004. The mounting structure 1004 may be formed to mount the first mirror unit 102, e.g. to mount the frame-like structure 706 of the first mirror unit 102. In other words, in various embodiments, the second mirror unit 118 may be formed or may include a mounting structure 1004 for the first mirror unit 102. In various embodiments, the second mirror unit 118 may be formed as or may include a cavity, and further may include a third area for mounting the first mirror unit 102. The second mirror unit 118 may have a shape similar to a bowl, dish or a box.

Further illustrated in FIG. 10, in various embodiments, the first area 104 may surround the second area 106 of the second mirror unit 118.

In various embodiments, the first area 104 and the second area 106 are monolithically integrated in the second mirror unit 118.

In various embodiments, the first area 104 and the second area 106 are formed in the same plane of the second mirror unit 118. Alternatively or in addition, the first area 104 and the second area 106 are formed coplanar. Alternatively or in addition, the first area 104 may be formed side by side to the second area 106.

In various embodiments, the first area 104 at least partially surrounds the second area 106. The first area 104 may be formed such that the first area 104 surrounds the second area 106 coaxially.

In various embodiments, the first area 104 and the second area 106 are stacked over each other. Alternatively or in addition, the first area 104 may be formed above the second area 106.

In various embodiments, the second mirror unit 118 may include a fixed semitransparent mirror 1002, a photodetector and a bulk material of the first layer 504. The semitransparent mirror 1002 may be formed as an electrode coupled to the photodetector, a driving circuit or distance determining circuit.

In various embodiments, the semitransparent mirror 1002 may be free of a physical contact with the second area 106 or bulk material of the first layer 504.

In various embodiments, the first area 104 may include at least one reflective material and/or semitransparent mirror 1002 regarding the electromagnetic radiation of at least one wavelength or wavelength range.

In various embodiments, the first area 104 may include two or more different materials and/or semitransparent mirrors 1002 that are reflective for the electromagnetic radiation of the at least one wavelength or wavelength range.

In various embodiments, the first area 104 of the second mirror unit 118 may include a layer, e.g. semitransparent mirror 1002, formed as a ring structure 1002 above the second area 106.

In various embodiments, the first area 104 may include or may be formed from a metal.

In various embodiments, the first area 104 may include or may be formed from a reflective coating or a reflective substrate. The first area 104 of the second mirror unit 118 may be used to reduce the exposed photosensitive area of the photodetector in the second area 106 of the second mirror unit 118, e.g. to increase the signal-to-noise ratio of the signal of the photodetector.

In various embodiments, the first area 104 may include a part of the photodetector. The first area 104 may be a reflective surface of the photodetector, e.g. a reflective coating of the photodetector or a reflective surface of the photodetector.

Figure 11A:
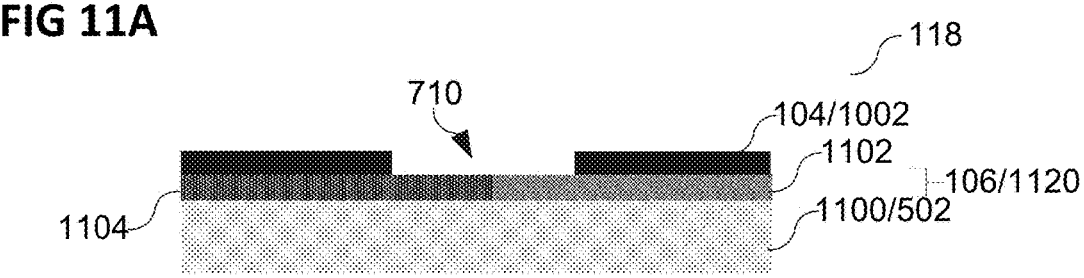
FIG. 11A to FIG. 11D illustrate various examples of a second mirror unit of a spectrometer according to various embodiments.

FIG. 11A illustrates an example of a second mirror unit 118 of a spectrometer according to various embodiments. The spectrometer may be substantially similar to an embodiment of an above described spectrometer. The second mirror unit 118 illustrated in FIG. 11A may be substantially similar to the second mirror unit 118 shown in FIG. 10. The second mirror unit 118 illustrated in FIG. 11A may be an enlarged illustration of the second mirror unit 118 illustrated in FIG. 10. Further illustrated in FIG. 11A, the second area 106 may include a photodetector having a semiconductor structure 1120. The semiconductor structure 1120 may include a p-type region 1104 and an n-type region 1102. The p-type region 1104 may be formed laterally adjacent to the n-type region 1102. Further, the second mirror unit 118 may include a substrate 1100. The substrate 1100 may be substantially similar to the substrate 502, as shown. Alternatively, the semiconductor structure 1120 may be formed on the first layer 504.

In various embodiments, the photodetector may include or may be formed from a material having photoresistor properties regarding the electromagnetic radiation with at least one wavelength 120 or wavelength range. The photodetector may include at least one of the following structures or may be formed as such: a photographic plate, a reverse biased light emitting diode, a photoresistor, a photodiode, a photocathode, a photo transistor, a quantum dot photoconductor or photodiode.

In various embodiments, the photodetector may include or be formed as a pn junction of a p-type region 1104 and an n-type region 1102, as shown. The pn junction may be formed such that the incident electromagnetic radiation generates free charge carriers that may be used to generate a spectrum 150 (see also FIG. 1C). The photodetector may be formed substantially similar to a commercially available photodetector, e.g. it may include or be formed from common semiconductor materials. The electromagnetic radiation may be at least one of UV light, visible light or infrared light, e.g. in a wavelength range of about 380 nm to about 1350 nm.

In various embodiments, the pn junction may be formed by a contact of a p-type region 1104 and an n-type region 1102 wherein the p-type region 1104 and the n-type region 1102 are formed in about the same plane parallel to the first mirror unit 102 above a substrate 1100, e.g. a silicon substrate 1100. In other words, the photodetector may be based on silicon or any other suitable semiconductor material.

In various embodiments, the second mirror unit 118 may include a substrate, e.g. a silicon wafer, e.g. a p-type substrate; wherein the p-type region 1104 may be formed from or may include a p-doped region, (e.g. p+ doped) in the substrate and the n-type region 1102 may be formed from or may include an n-doped region (e.g. n+ doped) in the substrate.

In various embodiments, the second area 106 may have a smaller surface area exposed to the electromagnetic radiation of at least one wavelength or wavelength range than the first area 104. The smaller surface may be formed by an aperture 710.

Figure 11B:
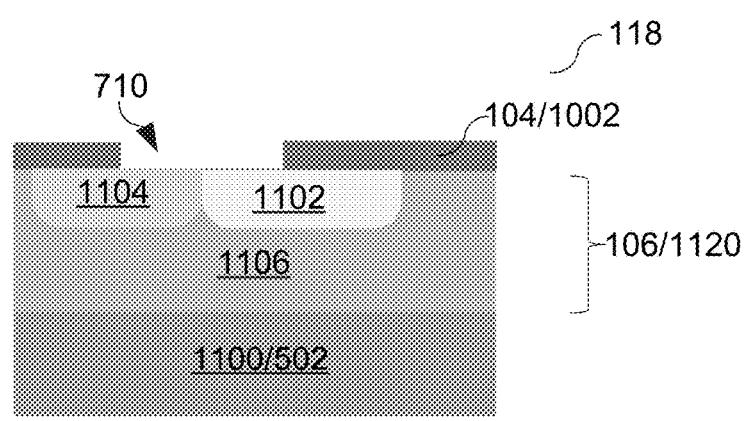

FIG. 11B illustrates an example of a second mirror unit 118 of a spectrometer according to various embodiments. The spectrometer may be substantially similar to an embodiment of an above described spectrometer. The second mirror unit illustrated in FIG. 11B may be substantially similar to the second mirror unit 118 shown in FIG. 10. The second mirror unit 118 illustrated in FIG. 11B may be an enlarged illustration of the second mirror unit 118 illustrated in FIG. 10. As illustrated in FIG. 11B, the p-type region 1104 and the n-type region 1102 may be formed in a semiconductor layer 1106 (also referred as substrate layer 1106) disposed over the substrate 1100.

Figure 11C:
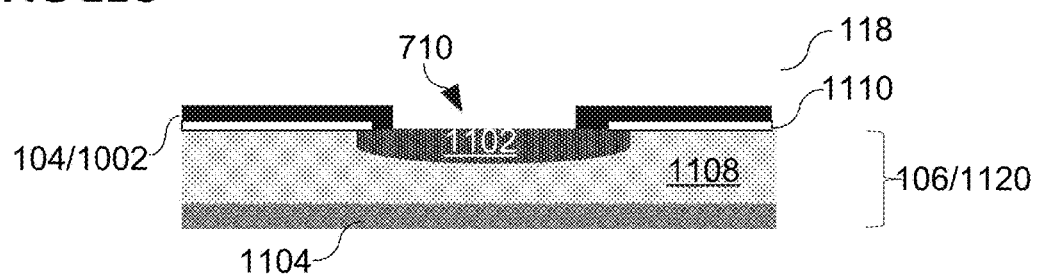

FIG. 11C illustrates an example of a second mirror unit 118 of a spectrometer according to various embodiments. The spectrometer may be substantially similar to an embodiment of an above described spectrometer. The second mirror unit 118 illustrated in FIG. 11C may be substantially similar to the second mirror unit 118 shown in FIG. 10. The second mirror unit 118 illustrated in FIG. 11C may be an enlarged illustration of the second mirror unit 118 illustrated in FIG. 10. As illustrated in FIG. 11C, the p-type region 1104 and the n-type region 1102 may be stacked above each other. Further illustrated in FIG. 11C, the ring-like structure 1002 may be formed as a first electrode of the photodetector, e.g. the semiconductor structure 1120, of the second mirror unit 118. Further, the semiconductor structure 1120 may include an intrinsic semiconductor layer 1108 disposed between the p-type region 1104 and the n-type region 1102. Hence, the semiconductor structure may include a pin-structure (p-type—intrinsic—n-type). Further, the ring-like structure 1002 may be electrically insulated by means of a dielectric structure 1110 between the intrinsic semiconductor layer 1108 and the ring-like structure 1002. In other words, the photodetector may include or be formed as a pin junction composed of a p-type region 1104, an intrinsic semiconductor layer 1108 and an n-type region 1102. Alternatively, the photodetector may include an np or nip structure.

In various embodiments, the photodetector and/or the first area 104 may include a metal layer 1002 and/or a dielectric layer 1110, e.g. an oxide layer 1110. The metal layer 1002 may be used as electrical contact 1208 of the photodetector (see also FIG. 12 and FIG. 13) and/or as reflective structure as (a part of) the first area 104. The dielectric layer 1110 may be used as electric insulation between the electrical contact 1208 and another electrode 1206. Alternatively or in addition, the first area 104 may include the dielectric layer 1110.

In various embodiments, the second mirror unit 118 may include a substrate 1100 wherein the p-type region 1104 and the n-type region 1102 are formed above the substrate, as shown e.g. in FIGS. 11A and 11B.

Figure 11D:
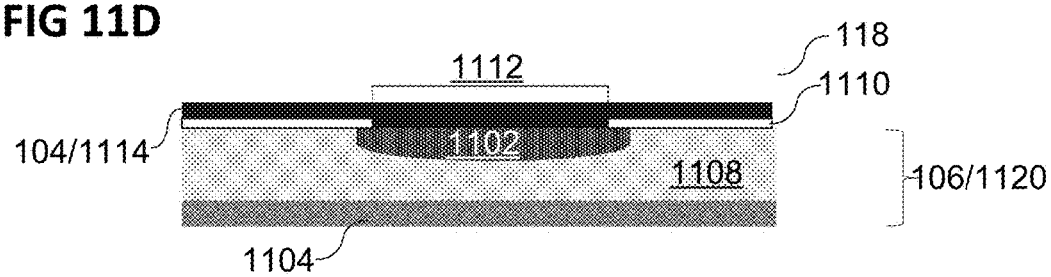

In various embodiments, a pn junction may be formed by a contact of the p-type region 1104 and the n-type region 1102 wherein the p-type region 1104 and the n-type region 1102 are stacked over each other, as shown e.g. in FIGS. 11C and 11D.

FIG. 11D illustrates an example of a second mirror unit 118 of a spectrometer according to various embodiments. The spectrometer may be substantially similar to an embodiment of an above described spectrometer. The second mirror unit illustrated in FIG. 11D may be substantially similar to the second mirror unit 118 shown in FIG. 10. The second mirror unit 118 illustrated in FIG. 11D may be an enlarged illustration of the second mirror unit 118 illustrated in FIG. 10. Further, the second mirror unit 118 illustrated in FIG. 11D may be substantially similar to the second mirror unit illustrated in FIG. 11C. Further illustrated in FIG. 11D, the ring-like structure 1002 may be formed as a "circle-like structure 1114" (a ring-like structure having a filled center or hole portion) having a semitransparent structure 1112 above the second area 106, e.g. in the beam path of the incident electromagnetic radiation 110, 114. The first area 104 may include the circle-like structure 1114.

In other words, in various embodiments, the second mirror unit 118 may include a semitransparent layer above the first area 104 and the second area 106, e.g. a thin metal layer, e.g. illustrated in FIG. 11D in the region 1112. In other words, the second area 106 may include a lateral or vertical pin-diode or pn-diode with or without a closed metal layer, e.g. used as semitransparent mirror 1002 above. In various embodiments, the semitransparent layer of the second mirror unit 118 may be formed above the first area 104 and the second area 106 in one piece, e.g. as an optical filter or reflection coating. The semitransparent layer of the second mirror unit 118 may be formed in the beam path of the electromagnetic radiation of at least one wavelength 120 or wavelength range.

FIG. 12 shows a schematic drawing of electrodes used for distance determination and/or driving in a spectrometer according to various embodiments. The spectrometer may be substantially similar to an embodiment of the above described spectrometer 100 or 500.

Further illustrated in FIG. 12, in various embodiments, the spectrometer may include at least one first electrode 1202, 1204 and at least one second electrode 1212, 1214. The first mirror unit 102 may include the at least one first electrode 1202, 1204 and the second mirror unit 118 may include the at least one second electrode 1212, 1214.

In various embodiments, the first area 104 may include the at least one second electrode 1212, 1214. The at least one first electrode 1202, 1204 may be electrically isolated from the at least one second electrode 1212, 1214 such that the at least one first electrode 1202, 1204 may have a first charge or conduct a first electrical current and the at least one second electrode 1212, 1214 may have a second charge or conduct a second electrical current.

Further illustrated in FIG. 12, in various embodiments, the first and second mirror units 102, 118 may respectively have at least two electrodes wherein the at least two electrodes are formed side by side.

Further illustrated in FIG. 12, in various embodiments, at least one electrode 1202, 1204, 1212, and 1214 may be formed in a shape that may include at least one hole 1200, e.g. at least one hole above the second area 106. The at least one hole 1200 may be transparent regarding the incident electromagnetic radiation 116 of the at least one wavelength 120 or wavelength range. In other words, in various embodiments, the first mirror unit 102 may include at least one open hole 1200, e.g. in the electrodes 1202, 1204. The open hole 1200 may be formed, e.g. having a diameter of the opening, such that the open hole 1200 may be transparent for at least a part of the incident electromagnetic radiation. The first mirror unit 102 may be formed intransparent, e.g. reflective or specular, except for the open hole 1200, e.g. by means of the electrodes 1202, 1204.

The hole 1200 may be a part of an aperture 710 as described above.

Further, the second area 106 may include the at least one electrode 1212, 1214 of the second mirror unit 118. Further, the at least one electrode 1212, 1214 of the second mirror unit 104 may be formed as ring like structure 1002 (see FIG. 10).

Further, the semitransparent layer 800 of the first mirror unit (see FIG. 8A and FIG. 8B) may include the at least one electrode 1202, 1204 of the first mirror unit 102.

Further illustrated in FIG. 12, the first and second mirror units 102, 118 may include conductive lines 1206 that may be coupled to the electrodes 1202, 1204, 1212 and 1214 of the first and second mirror units 102, 118. The conductive lines 1206 may be coupled to at least one of a driving circuit or a distance determining circuit, as described below in more detail. Furthermore, the second mirror unit 118 may include conductive lines 1208 that may be coupled to the photodetector, for example a first conductive line 1208 coupled to the p-type region 1104, and a second conductive line 1208 coupled to the n-type region 1102 of the photodetector, as shown.

As illustrated in FIG. 12, the conductive lines 1208 may be disposed in a feed-through region 1210 disposed between two electrodes 1212 and 1214.

A spectrometer in accordance with various embodiments, e.g. the spectrometer 100, may include a distance determining circuit to determine the distance 108 between the first mirror unit 102 and the second mirror unit 118. In various embodiments, the distance determining circuit may be formed at least partially between the first mirror unit 102 and the second mirror unit 118. In various embodiments, the distance determining circuit may be configured to determine or find the distance 108 based on a measurement of an interference of an electromagnetic radiation. In various embodiments, the distance determining circuit may be configured to determine the distance 108 based on a measurement of a capacitance.

In various embodiments, the distance determining circuit may be coupled to at least one first electrode, e.g. 1202 and/or 1204, and at least one second electrode, e.g. 1212 and/or 1214. The first mirror unit 102 may include the at least one first electrode 1202, 1204 and the second mirror unit 118 may include the at least one second electrode 1212, 1214.

In various embodiments, the first area 104 may include the at least one second electrode 1212, 1214. The at least one first electrode 1202, 1204 may be electrically isolated from the at least one second electrode 1212, 1214 such that the at least one first electrode 1202, 1204 may have a first charge or a conduct first electrical current and the at least one second electrode 1212, 1214 may have a second charge or conduct a second electrical current. In other words: The distance determining circuit may be configured to determine the distance 108 between the first mirror unit 102 and the second mirror unit 118 by means of determining a capacitance between one or more of the electrodes of the first mirror unit 102 and one or more of the electrodes of the second mirror unit 118.

In various embodiments, electrodes 1202, 1204, 1212, 1214 may be used as amplitude sensing layers of a deflection of the first mirror unit 102 relative to the second mirror unit 118. The distance determining circuit may be based on capacitance sensing and the driving circuit may be based on amplitude driving. Alternatively or in addition, the electrodes 1202, 1204, 1212, and 1214 may be used as amplitude excitation layer of the driving circuit.

In various embodiments, the spectrometer may include at least one driving circuit and at least one distance determining circuit. The at least one distance determining circuit may be coupled to at least one first electrode 1202/1204 and at least one second electrode 1212/1214. The at least one driving circuit may be coupled to at least one first electrode 1204/1202 and at least one second electrode 1214/1212. The first mirror unit 102 may include the at least one first electrode 1202, 1204 coupled to the distance determining circuit and the driving circuit, and the second mirror unit 118 may include the at least one second electrode 1212, 1214 coupled to the distance determining circuit and the driving circuit. The electrodes 1202, 1204, 1212, and 1214 may be used exclusively or exchangeably by the driving circuit and the distance determining circuit. An exchangeable use may include alternate driving and distance determination (e.g. by capacitance measurement).

In other words, in various embodiments, the electrodes 1202, 1204, 1212, 1214 of the first mirror unit 102 and the second mirror unit 118 may be used interchangeably for the driving circuit and the distance determining circuit.

For example: at a first time of operation of the spectrometer, the first and second electrodes are used to determine the distance 108 and during a second time of operation, the first and second electrodes are used to adjust the distance 108 between the first mirror unit 102 and second mirror unit 118.

Alternatively, one of the first electrodes 1202, 1204 of the first mirror unit 102, e.g. the first electrode 1202, and one of the second electrodes 1212, 1214 of the second mirror unit, e.g. the second electrode 1212, may be used to determine the distance 108 between the first mirror unit 102 and second mirror unit 118 by measuring a capacitance between the electrodes 1202 and 1212 while another one of the first electrodes 1202, 1204, e.g. 1204, of the first mirror unit 102 and another one of the second electrodes 1212, 1214, e.g. 1214, may be used for adjusting the distance 108.

Alternatively or in addition, the first and second electrodes of the first mirror unit 102 and second mirror unit 118 may be used to adjust a tilt between the first mirror unit 102 and second mirror unit 118.

In various embodiments, at least one electrode 1202, 1204, 1212, and 1214 coupled to the distance determining circuit may be arranged next to at least one electrode 1202, 1204, 1212 and 1214 coupled to the driving circuit in or about in the same plane.

In various embodiments the first mirror unit 102 and second mirror unit 118 may include two or more electrodes for determining or adjusting the distance 108 between the first mirror unit 102 and second mirror unit 118, e.g. in a tripod-like or multipod-like arrangement to adjust a tilt between the first and second mirror unit.

In various embodiments, the electrodes 1202, 1204, 1212, 1214 may have at least one electrical contact for electrically contacting. In various embodiments, in which electrodes may have only one electrical contact respectively, the distance determining circuit may be based on a capacitance measurement and the driving circuit may be based on electrostatic repulsion or attraction. In various embodiments in which electrodes may have at least two electrical contacts respectively, the distance determining circuit may be based on an induction measurement and the driving circuit may be based on electrodynamic repulsion or attraction.

FIG. 13 shows a schematic drawing of electrodes used for distance determination and/or driving in a spectrometer according to various embodiments. The spectrometer may be substantially similar to an embodiment of a spectrometer as described herein above. Further illustrated in FIG. 13, the first and second mirror units 102, 118 may respectively have at least two electrodes wherein the at least two electrodes are formed coaxially to each other.

In various embodiments, at least a part of one electrode of the electrodes 1202, 1204, 1212, and 1214 coupled to the distance determining circuit may be at least partially surrounding at least a part of another electrode of the electrodes 1202, 1204, 1212, and 1214 coupled to the driving circuit or vice versa. For example, at least a part of the electrode 1202 may at least partially surround at least a part of electrode 1204, as shown. This may reduce a potential tilt between the first mirror unit 102 and second mirror unit 118.

Figure 14:
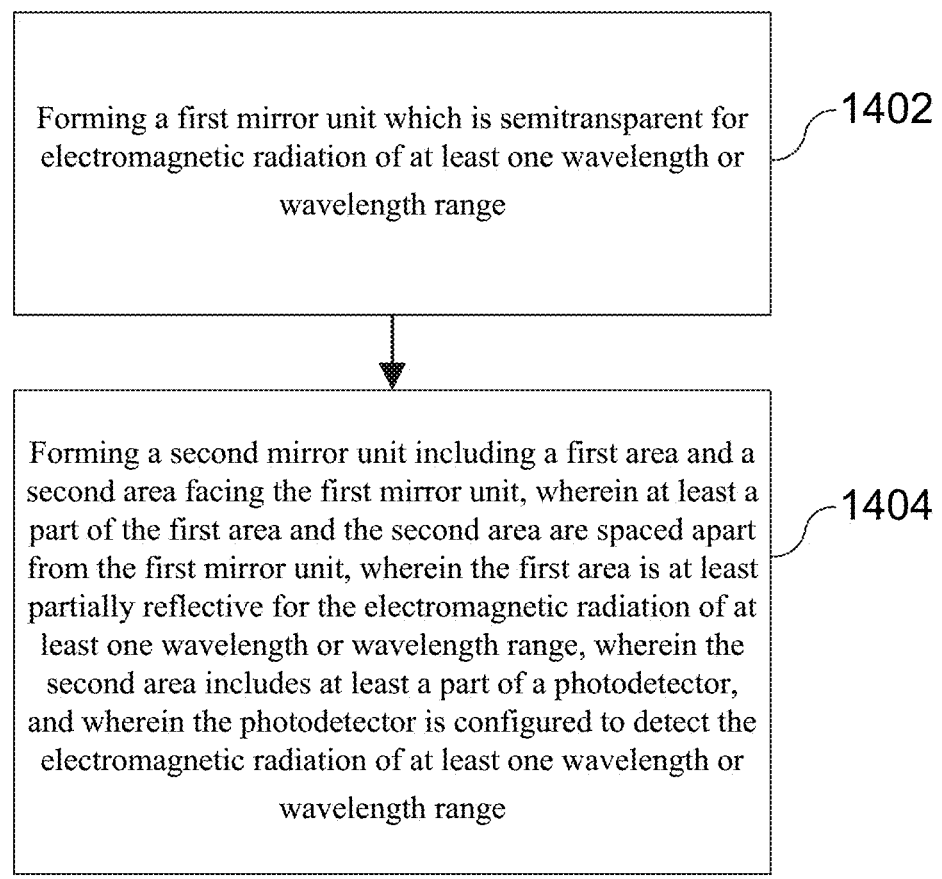
FIG. 14 shows a flow diagram of a method for manufacturing a spectrometer according to various embodiments.

FIG. 14 shows a flow diagram of a method for manufacturing a spectrometer according to various embodiments. The spectrometer may be substantially similar to an embodiment of an above described spectrometer. In various aspects the method 1400 for manufacturing a spectrometer may include forming 1402 a first mirror unit which may be semitransparent for electromagnetic radiation of at least one wavelength or wavelength range. Further, the method 1400 may include forming 1404 a second mirror unit including a first area and a second area facing the first mirror unit, wherein at least a part of the first area and the second area are spaced apart from the first mirror unit, wherein the first area may be at least partially reflective for the electromagnetic radiation of at least one wavelength or wavelength range, wherein the second area may include at least a part of a photodetector, and wherein the photodetector may be configured to detect the electromagnetic radiation of at least one wavelength or wavelength range.

Figure 15:
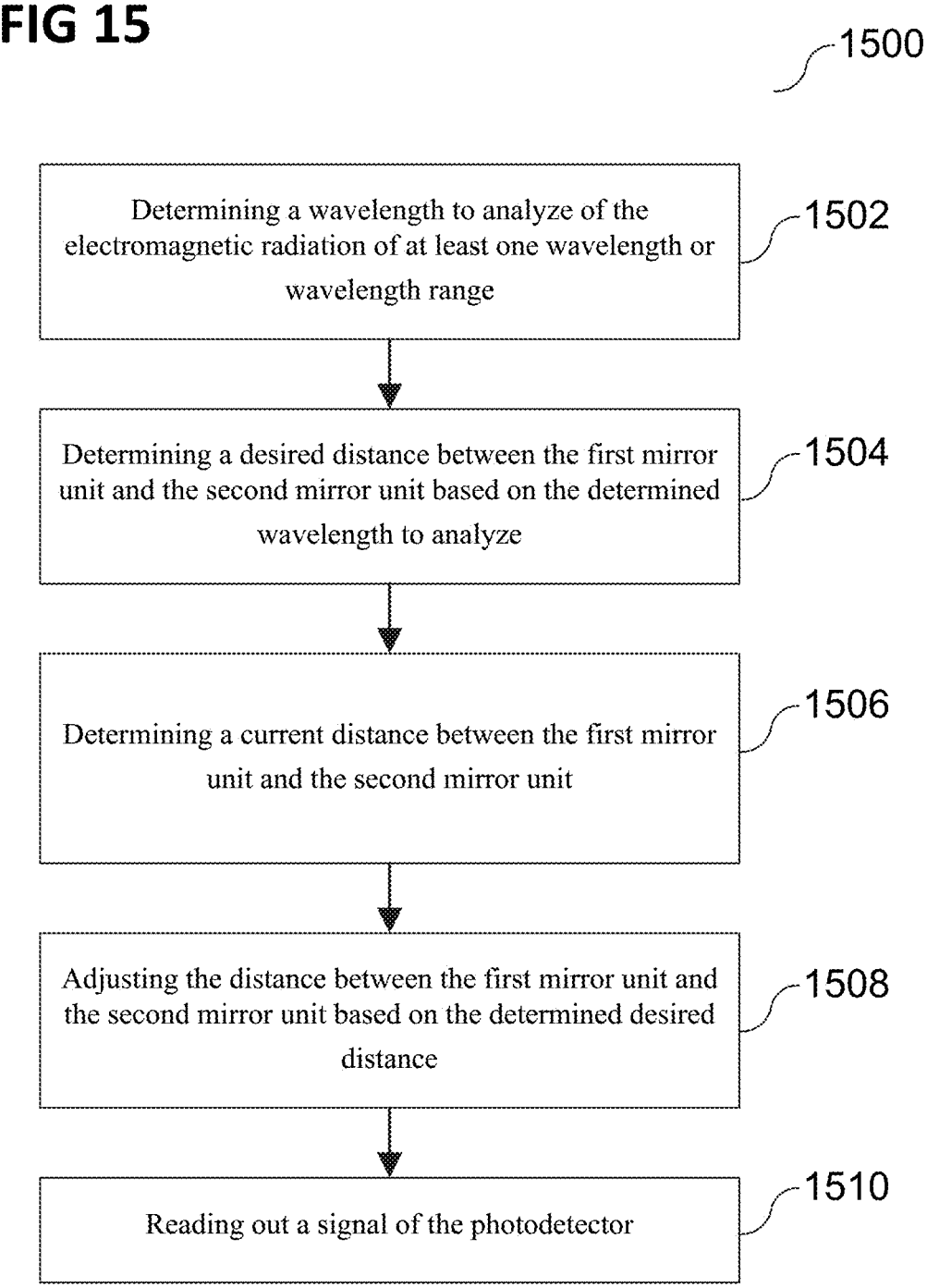
FIG. 15 shows a flow diagram of a method for operating a spectrometer according to various embodiments.

FIG. 15 shows a flow diagram of a method for operating a spectrometer according to various embodiments. The spectrometer may include a first mirror unit which may be semitransparent for electromagnetic radiation of at least one wavelength or wavelength range and a second mirror unit including a first area and a second area facing the first mirror unit, wherein at least a part of the first area and the second area are spaced apart from the first mirror unit, wherein the first area may be at least partially reflective for the electromagnetic radiation of at least one wavelength or wavelength range, wherein the second area may include at least a part of a photodetector, wherein the photodetector may be configured to detect the electromagnetic radiation of at least one wavelength or wavelength range.

In various aspects the method 1500 may include: determining 1502 a wavelength to analyze of the electromagnetic radiation of at least one wavelength or wavelength range; determining 1504 a desired distance between the first mirror unit and the second mirror unit based on the determined wavelength to analyze; determining 1506 a current distance between the first mirror unit and the second mirror unit; adjusting 1508 the distance between the first mirror unit and the second mirror unit based on the determined desired distance; and reading 1510 out a signal of the photodetector.

In various embodiments, adjusting 1508 the distance between the first mirror unit and the second mirror unit may include a coarse adjustment of the distance and a subsequent fine adjustment of the distance.

In various embodiments, the method 1500 may further include determining at least one additional wavelength to analyze of the electromagnetic radiation of at least one wavelength or wavelength range; adjusting the distance between the first mirror unit and the second mirror unit based on the determined at least one additional wavelength; and reading out a signal of the photodetector. The adjusting 1508 of the distance between the first mirror unit and the second mirror unit based on the determined at least one additional wavelength may include an increasing the distance in a predetermined step size. The additional wavelength may be part of a wavelength sweep through a predetermined wavelength range. The resolution of the wavelength sweep may be adjusted by determining the step size. The predetermined step size may be based on the distance and the determined wavelength range to analyze. In other words, the predetermined step size may be dependent on the difference between the maximal and minimal deflection of the (deflectable part of the) first mirror unit relative to the second mirror unit. Thus, the scan rate of the incident electromagnetic radiation may be large allowing to quickly generate a spectrum of the incident electromagnetic radiation of at least one wavelength or wavelength range. Further, the scan rate and signal to noise ration of the signal generated by the photodetector may be increased by binning signals/measurement values of the photodetector of at least two wavelengths separated by at least one predetermined step. Further, the spectra of at least two successively determined wavelength sweeps may be used to generate a spectrum of the photodetector, e.g. by means of integration of the individual spectra.

In various embodiments, adjusting 1508 the distance between the first mirror unit and the second mirror unit may be repeated until all signals of the wavelength range to analyze are read out using an increment of the distance of about the predetermined step size.

In various aspects, a spectrometer may be provided. The spectrometer may include a first mirror unit which may be semitransparent for electromagnetic radiation of at least one wavelength or wavelength range; and a second mirror unit including a first area and a second area facing the first mirror unit, wherein at least a part of the first area and the second area are spaced apart from the first mirror unit, wherein the first area may be at least partially reflective for the electromagnetic radiation of at least one wavelength or wavelength range, wherein the second area may include at least a part of a photodetector, and wherein the photodetector may be configured to detect the electromagnetic radiation of at least one wavelength or wavelength range. The spectrometer may be design with reduced size by including a photodetector in the second mirror unit. Thus, the spectrometer may be used for applications with limited space available for a spectrometer.

In various embodiments, the first mirror unit may be formed such that at least a part of the first mirror unit may be deflectable in at least one of a direction towards the second mirror unit or a direction away from the second mirror unit. Thus, the distance between the first mirror unit and the second mirror unit may be adjustable. Hence, the determinable wavelength may be adjusted by adjusting the interference conditions caused by means of the distance between the first and second mirror units. The deflectable part of the first mirror unit may be formed such that a distance between the first mirror unit and the second mirror unit may be adjustable.

In various embodiments, the first mirror unit may include a membrane. Thus, the first mirror unit may be formed free of moving parts side by side the membrane. Hence, the time to generate a spectrum may be reduced and the spectrometer may be formed more robust. The first mirror unit may be formed from a membrane. The membrane may be a diaphragm. The membrane may be formed similar to a common silicon microphone membrane, e.g. based on its method to manufacturing.

In various embodiments, the first mirror unit may include at least one elastic element and a planar area wherein the planar area may be mounted deflectable by means of the at least one elastic element. The deflectable part may include a base area and at least one supporting member attached to the base area. The planar area may be a part of the elastic element. e.g. an elastic element formed as a cantilever. The planar area may be a reflective part or area of the first mirror unit. The first mirror unit may include open holes, e.g. between two adjacent elastic elements. The open holes may from a transparent portion or area of the first mirror unit. A first mirror unit having a planar area may be formed with a larger portion which may be parallel to the second mirror unit. The required amplitude of the deflection may be adjusted by means of the properties of the elastic elements.

In various embodiments, the first area surrounds the second area at least partially. Thus, the first area may be used to reduce the size of the second area that may be exposed to the incident electromagnetic radiation. Further, the surrounding area may be used to form a homogenous interference pattern or intensity distribution of the incident electromagnetic radiation along the second area.

In various embodiments, the first area may include a part of the photodetector. The first area may be a surface or a coating of the photodetector. Hence, the second mirror unit may be robust an easy to manufacture.

In various embodiments, the first mirror unit may include a first surface and the second mirror unit may include a second surface facing the first surface, wherein the first and second are at least substantially parallel to each other. Thus, the intensity of the signal in the spectrum of the detector may be increased.

In various embodiments, the spectrometer further may include an aperture 710 between the first mirror unit and the second mirror unit. Thus, the size of the second area that may be exposed to the incident electromagnetic radiation may be reduced. Hence, the signal to noise ratio maybe increased.

In various embodiments, the spectrometer further may include at least one driving circuit configured to deflect the deflectable part of the first mirror unit. Thus, the interference condition and determinable wavelength of the electromagnetic radiation may be adjusted. Further, a misalignment of the first mirror unit regarding the second mirror unit may be adjusted. The deflectable may be deflected regarding the first area and second area to adjust the space between the first mirror unit and second mirror unit.

In various embodiments, the first mirror unit may include a first electrode coupled to the at least one driving circuit and the second mirror unit may include a second electrode at least partially facing the first electrode and coupled to the at least one driving circuit.

In various embodiments, the at least one driving circuit may include a first driving circuit and a second driving circuit wherein the first driving circuitis configured to coarsely adjust a distance between the first mirror unit and the second mirror unit, and the second driving circuitis configured to finely adjust the distance between the first mirror unit and the second mirror unit. Thus, the alignment of the first mirror unit regarding the second mirror unit may be simplified or may be less time consumable using different alignment speeds. Further, a wider variety of wavelength may be precisely determinable by use of different driving circuits for a coarse and fine adjustment.

In various embodiments, the first mirror unit may include a first electrode coupled to the first driving circuit and a second electrode coupled to the second driving circuit, and wherein the second mirror unit may include at least one electrode coupled to at least one of the first driving circuit or the second driving circuit and at least partially facing at least one of the first electrode or second electrode of the first mirror unit.

In various embodiments, the second mirror unit may include a third electrode coupled to the first driving circuit and at least partially facing the first electrode of the first mirror unit, and a fourth electrode coupled to the second driving circuit and at least partially facing the second electrode of the first mirror unit.

In various embodiments, the first mirror unit may include at least one electrode coupled to at least one of the first driving circuit or the second driving circuit, and wherein the second mirror unit may include a first electrode coupled to the first driving circuit and a second electrode coupled to the second driving circuit, the first and second electrodes at least partially facing the at least one electrode of the first mirror unit.

In various embodiments, the spectrometer further may include a distance determining circuit to determine a distance between the first mirror unit and the second mirror unit. The distance determining circuit may be formed at least partially between the first mirror unit and the second mirror unit. Thus, a compact spectrometer may be formed having precisely adjustable interference conditions.

In various embodiments, the first mirror unit may include a first capacitor electrode coupled to the distance determining circuit and the second mirror unit may include a second capacitor electrode at least partially facing the first capacitor electrode and coupled to the distance determining circuit.

In various embodiments, the spectrometer may include at least one driving circuit and a distance determining circuit, wherein the first mirror unit may include a first capacitor electrode and the second mirror unit may include a second capacitor electrode, wherein the first and second capacitor electrodes are coupled to the distance determining circuit, and wherein the first mirror unit may include a first driving electrode and the second mirror unit may include a second driving electrode, wherein the first and second driving electrodes are coupled to the at least one driving circuit. A capacitor electrode may be an electrode of a capacitor and a driving electrode an electrode of a driving circuit. In other words, the spectrometer may include at least one driving circuit and a distance determining circuit, wherein the distance determining circuit may be coupled to at least a first electrode and a second electrode, and wherein the at least one driving circuit may be coupled to at least a first electrode and a second electrode, wherein the first mirror unit may include the first electrodes of the distance determining circuit and the driving circuit, and the second mirror unit may include the second electrodes of the distance determining circuit and the driving circuit. The determined distance by the distance determining circuit may be used to adjust the distance by using the driving circuit in a compact spectrometer design. The integration of the electrodes coupled to the driving circuit and the distance determining circuit between the first mirror unit and the second mirror unit may allow a precise determination and adjustment of the distance.

In various embodiments, the second mirror unit may include a cavity and a third area for mounting the first mirror unit. Alternatively or in addition, the second mirror unit may be formed as cavity. Further, the third area may be a part of the first mirror unit, e.g. by forming the first and second mirror unit monolithically of the same bulk material. In various embodiments, the first mirror unit and the second mirror unit are formed of one piece, e.g. are monolithically integrated. In various embodiments, the first mirror unit and the second mirror unit are formed from individual pieces, e.g. different wafers. The first mirror unit may be connected with the second mirror unit by means of a spacer or mount. The spacer or mount may be formed between the first mirror unit and second mirror unit and may include a physical contact with both. Alternatively, the first mirror unit may and the second mirror unit may be separated from each other, without physical contacts to a pacer or mount.

In various embodiments, the device further may include a radiation source configured to emit at least a part of the electromagnetic radiation of at least one wavelength or wavelength range. The source of the electromagnetic radiation may be used to increase the intensity of the incident electromagnetic radiation at the photodetector. The source may increase the intensity of the electromagnetic radiation that may be reflected from a device external surface wherein the reflected electromagnetic radiation forms at least a part of the incident electromagnetic radiation.

In various aspects, a method for manufacturing a spectrometer may be provided. The method may include forming a first mirror unit which may be semitransparent for electromagnetic radiation of at least one wavelength or wavelength range; and forming a second mirror unit including a first area and a second area facing the first mirror unit, wherein at least a part of the first area and the second area are spaced apart from the first mirror unit, wherein the first area may be at least partially reflective for the electromagnetic radiation of at least one wavelength or wavelength range, wherein the second area may include at least a part of a photodetector, and wherein the photodetector may be configured to detect the electromagnetic radiation of at least one wavelength or wavelength range.

In various aspects, a method for operating a spectrometer may be provided. The spectrometer may include a first mirror unit which may be semitransparent for electromagnetic radiation of at least one wavelength or a second mirror unit including a first area and a second area facing the first mirror unit, wherein at least a part of the first area and the second area are spaced apart from the first mirror unit, wherein the first area may be at least partially reflective for the electromagnetic radiation of at least one wavelength and wherein the second area may include at least a part of a photodetector, wherein the photodetector may be configured to detect the electromagnetic radiation of at least one wavelength and wherein the first mirror unit may be formed such that at least a part of the first mirror unit may be deflectable in at least one of a direction towards the second mirror unit or a direction away from the second mirror unit; a distance determining circuit to determine a distance between the first mirror unit and the second mirror unit; and a driving circuit configured to deflect the deflectable part of the first mirror unit. The method may include: determining a wavelength to analyze of the electromagnetic radiation of at least one wavelength or wavelength range; determining a desired distance between the first mirror unit and the second mirror unit based on the determined wavelength to analyze; determining a current distance between the first mirror unit and the second mirror unit using the distance determining circuit; adjusting the distance between the first mirror unit and the second mirror unit using the driving circuit based on the determined desired distance; and reading out a signal of the photodetector.

In various aspects, a method for operating a spectrometer may be provided. The spectrometer including: a first mirror unit which may be semitransparent for electromagnetic radiation of at least one wavelength or wavelength range and a second mirror unit including a first area and a second area facing the first mirror unit, wherein at least a part of the first area and the second area are spaced apart from the first mirror unit, wherein the first area may be at least partially reflective for the electromagnetic radiation of at least one wavelength or wavelength range, wherein the second area may include at least a part of a photodetector, wherein the photodetector may be configured to detect the electromagnetic radiation of at least one wavelength or wavelength range. The the method may include determining a wavelength to analyze of the electromagnetic radiation of at least one wavelength or wavelength range; determining a desired distance between the first mirror unit and the second mirror unit based on the determined wavelength to analyze; determining a current distance between the first mirror unit and the second mirror unit; adjusting the distance between the first mirror unit and the second mirror unit based on the determined desired distance; and reading out a signal of the photodetector.

In various embodiments of the method, adjusting the distance between the first mirror unit and second mirror unit may include a coarse adjustment of the distance and a fine adjustment of the distance. The coarse adjustment may use a first driving circuit and the fine adjustment may use a second driving circuit. Further, using a first driving circuit for the coarse adjustment reduces the amount of the spectrometer that oscillates during operation. Hence, the scan rate to generate a spectrum of the photodetector may be increased. Further, the spectrometer may be formed having more robust optical and mechanical properties.

In various embodiments of the method, the method further may include: determining at least one additional wavelength to analyze of the electromagnetic radiation of at least one wavelength or wavelength range; adjusting the distance between the first mirror unit and the second mirror unit based on the determined at least one additional wavelength; and reading out a signal of the photodetector.

While the invention has been particularly shown and described with reference to specific embodiments, it should be understood by those skilled in the art that various changes in form and detail may be made therein without departing from the spirit and scope of the invention as defined by the appended claims. The scope of the invention may be thus indicated by the appended claims and all changes which come within the meaning and distance of equivalency of the claims are therefore intended to be embraced.

What is claimed is:

1. A spectrometer, comprising:
   a first mirror unit which is semitransparent for electromagnetic radiation of at least one wavelength or wavelength range; and
   a second mirror unit comprising a first area and a second area facing the first mirror unit, wherein at least a part of the first area and the second area are spaced apart from the first mirror unit, wherein the first area is at least partially reflective for the electromagnetic radiation of at least one wavelength or wavelength range, wherein the second area comprises at least a part of a photodetector, and wherein the photodetector is configured to detect the electromagnetic radiation of at least one wavelength or wavelength range.

2. The spectrometer of claim 1,
   wherein the first mirror unit is formed such that at least a part of the first mirror unit is deflectable in at least one of a direction towards the second mirror unit or a direction away from the second mirror unit.

3. The spectrometer of claim 2,
   further comprising at least one driving circuit configured to deflect the deflectable part of the first mirror unit.

4. The spectrometer of claim 3,
   wherein the first mirror unit comprises a first electrode coupled to the at least one driving circuit and the second mirror unit comprises a second electrode at least partially facing the first electrode and coupled to the at least one driving circuit.

5. The spectrometer of claim 3, wherein the at least one driving circuit comprises a first driving circuit and a second driving circuit wherein the first driving circuit is configured to coarsely adjust a distance between the first mirror unit and the second mirror unit, and the second driving circuit is configured to finely adjust the distance between the first mirror unit and the second mirror unit.

6. The spectrometer of claim 5, wherein the first mirror unit comprises a first electrode coupled to the first driving circuit and a second electrode coupled to the second driving circuit, and wherein the second mirror unit comprises at least one electrode coupled to at least one of the first driving circuit or the second driving circuit and at least partially facing at least one of the first electrode or second electrode of the first mirror unit.

7. The spectrometer of claim 6, wherein the second mirror unit comprises a third electrode coupled to the first driving circuit and at least partially facing the first electrode of the first mirror unit, and a fourth electrode coupled to the second driving circuit and at least partially facing the second electrode of the first mirror unit.

8. The spectrometer of claim 5, wherein the first mirror unit comprises at least one electrode coupled to at least one of the first driving circuit or the second driving circuit, and wherein the second mirror unit comprises a first electrode coupled to the first driving circuit and a second electrode coupled to the second driving circuit, the first and second electrodes at least partially facing the at least one electrode of the first mirror unit.

9. The spectrometer of claim 3, wherein the at least one driving circuit is configured to displace or deflect at least a part of the first mirror unit in a range of about the wavelength or the wavelength range of the electromagnetic radiation detectable by the photodetector or less.

10. The spectrometer of claim 1, wherein the first mirror unit comprises a membrane.

11. The spectrometer of claim 1, wherein the first mirror unit comprises at least one elastic element and a planar area wherein the planar area is mounted deflectable by means of the at least one elastic element.

12. The spectrometer of claim 1, wherein the first area surrounds the second area at least partially.

13. The spectrometer of claim 1, wherein the first area comprises a part of the photodetector.

14. The spectrometer of claim 1, wherein the first mirror unit comprises a first surface and the second mirror unit comprises a second surface facing the first surface, wherein the first and second surfaces are at least substantially parallel to each other.

15. The spectrometer of claim 1, further comprising an aperture between the first mirror unit and the second mirror unit.

16. The spectrometer of claim 1, further comprising a distance determining circuit to determine a distance between the first mirror unit and the second mirror unit.

17. The spectrometer of claim 16, wherein the first mirror unit comprises a first capacitor electrode coupled to the distance determining circuit and the second mirror unit comprises a second capacitor electrode at least partially facing the first capacitor electrode and coupled to the distance determining circuit.

18. The spectrometer of claim 1, wherein the spectrometer comprises at least one driving circuit and a distance determining circuit, wherein the first mirror unit comprises a first capacitor electrode and the second mirror unit comprises a second capacitor electrode, wherein the first and second capacitor electrodes are coupled to the distance determining circuit, and wherein the first mirror unit comprises a first driving electrode and the second mirror unit comprises a second driving electrode, wherein the first and second driving electrodes are coupled to the at least one driving circuit.

19. The spectrometer of claim 1, wherein the second mirror unit comprises a cavity and a third area for mounting the first mirror unit.

20. The spectrometer of claim 1, further comprising a radiation source configured to emit at least a part of the electromagnetic radiation of at least one wavelength or wavelength range.

21. A method for manufacturing a spectrometer, the method comprising:
forming a first mirror unit which is semitransparent for electromagnetic radiation of at least one wavelength or wavelength range;
forming a second mirror unit comprising a first area and a second area facing the first mirror unit, wherein at least a part of the first area and the second area are spaced apart from the first mirror unit, wherein the first area is at least partially reflective for the electromagnetic radiation of at least one wavelength or wavelength range, wherein the second area comprises at least a part of a photodetector, and wherein the photodetector is configured to detect the electromagnetic radiation of at least one wavelength or wavelength range; and
providing a distance determining circuit to determine a distance between the first mirror unit and the second mirror unit,
wherein the first mirror unit comprises a first capacitor electrode coupled to the distance determining circuit and the second mirror unit comprises a second capacitor electrode at least partially facing the first capacitor electrode and coupled to the distance determining circuit.

22. A method for operating a spectrometer, the spectrometer comprising: a first mirror unit which is semitransparent for electromagnetic radiation of at least one wavelength or wavelength range and a second mirror unit comprising a first area and a second area facing the first mirror unit, wherein at least a part of the first area and the second area are spaced apart from the first mirror unit, wherein the first area is at least partially reflective for the electromagnetic radiation of at least one wavelength or wavelength range, wherein the second area comprises at least a part of a photodetector, wherein the photodetector is configured to detect the electromagnetic radiation of at least one wavelength or wavelength range,
the method comprising:
determining a wavelength to analyze of the electromagnetic radiation of at least one wavelength or wavelength range;

determining a desired distance between the first mirror unit and the second mirror unit based on the determined wavelength to analyze;

determining a current distance between the first mirror unit and the second mirror unit;

adjusting the distance between the first mirror unit and the second mirror unit based on the determined desired distance; and reading out a signal of the photodetector.

23. The method of claim 22, wherein adjusting the distance between the first mirror unit and the second mirror unit comprises a coarse adjustment of the distance and a subsequent fine adjustment of the distance.

24. The method of claim 22, further comprising:

determining at least one additional wavelength to analyze of the electromagnetic radiation of at least one wavelength or wavelength range;

adjusting the distance between the first mirror unit and the second mirror unit based on the determined at least one additional wavelength; and reading out a signal of the photodetector.

25. A spectrometer, comprising:

a first mirror unit which is semitransparent for electromagnetic radiation of at least one wavelength or wavelength range;

a second mirror unit comprising a first area and a second area facing the first mirror unit, wherein at least a part of the first area and the second area are spaced apart from the first mirror unit, wherein the first area is at least partially reflective for the electromagnetic radiation of at least one wavelength or wavelength range, wherein the second area comprises at least a part of a photodetector, and wherein the photodetector is configured to detect the electromagnetic radiation of at least one wavelength or wavelength range;

wherein the first mirror unit is formed so that at least a part of the first mirror unit is deflectable in at least one of a direction towards the second mirror unit or a direction away from the second mirror unit, and a distance determining circuit to determine a distance between the first mirror unit and the second mirror unit by an induction or capacitance measurement.

26. The spectrometer of claim 25, wherein the distance determining circuit determines the distance between the first mirror unit and the second mirror unit by determining a capacitance between one or more of electrodes of the first mirror unit and one or more of electrodes of the second mirror unit.

* * * * *